(12) United States Patent
Fortune et al.

(10) Patent No.: US 8,516,885 B1
(45) Date of Patent: Aug. 27, 2013

(54) ROTATING OBJECT DYNAMIC BALANCING SYSTEM AND METHOD

(76) Inventors: Doug Fortune, Calgary (CA); Peter Stenabaugh, Calgary (CA)

( * ) Notice: Subject to any disclaimer, the term of this patent is extended or adjusted under 35 U.S.C. 154(b) by 1264 days.

(21) Appl. No.: 12/352,275

(22) Filed: Jan. 12, 2009

(51) Int. Cl.
*G01M 1/16* (2006.01)

(52) U.S. Cl.
USPC .............................. 73/470; 416/145; 73/456

(58) Field of Classification Search
USPC ........... 73/470, 457, 458, 460, 468; 416/144, 416/145
See application file for complete search history.

(56) References Cited

U.S. PATENT DOCUMENTS

| | | | |
|---|---|---|---|
| 414,642 A | 11/1889 | Herrick | |
| 1,314,005 A | 8/1919 | Louden | |
| 2,103,643 A | 12/1937 | Salomon | |
| 2,285,404 A | 6/1942 | Best | |
| 2,331,756 A | 10/1943 | Zobel | |
| 2,494,756 A | 1/1950 | Gruetjen | |
| 2,518,226 A | 8/1950 | Drake | |
| 2,771,240 A | 11/1956 | Gurin | |
| 2,895,766 A | 7/1959 | Leopold, Jr. | |
| 2,984,094 A | 5/1961 | Belaieff | |
| 3,282,127 A | 11/1966 | Deakin | |
| 3,316,021 A | 4/1967 | Salathiel | |
| 3,336,818 A * | 8/1967 | Allen | 74/570.2 |
| 3,339,429 A | 9/1967 | Whitlock | |
| 3,362,251 A | 1/1968 | Francis | |
| 3,410,154 A * | 11/1968 | Deakin | 74/571.1 |
| 3,415,217 A | 12/1968 | McGrath | |
| 3,433,534 A * | 3/1969 | Mercer | 301/5.22 |
| 3,464,738 A | 9/1969 | Pierce | |
| 3,696,688 A | 10/1972 | Goodrich et al. | |
| 3,724,904 A | 4/1973 | Nixon et al. | |
| 3,799,619 A * | 3/1974 | LaBarber | 301/5.22 |
| 3,854,347 A | 12/1974 | Hellerich | |
| 3,953,074 A | 4/1976 | Cox | |
| 4,060,009 A | 11/1977 | Wyman | |
| 4,075,909 A | 2/1978 | Deakin | |
| 4,431,348 A | 2/1984 | Powondra | |
| 4,433,592 A | 2/1984 | Tatsumi et al. | |
| 4,524,644 A | 6/1985 | Pierrat | |
| 4,674,356 A * | 6/1987 | Kilgore | 74/570.2 |
| 4,711,610 A * | 12/1987 | Riehl | 409/141 |

(Continued)

FOREIGN PATENT DOCUMENTS

| | | |
|---|---|---|
| AR | 202475 | 6/1975 |
| DE | 270136 A1 | 7/1989 |

*Primary Examiner* — Peter Macchiarolo
*Assistant Examiner* — Samir M Shah
(74) *Attorney, Agent, or Firm* — David A. Guerra

(57) ABSTRACT

A rotating object dynamic balancing system and method for balancing a rotating object including a shaft by using centrifugal force on a plurality of weighted masses traveling along at least one race. The rotating object dynamic balancing system has an inner body, an outer body, a fastening body or fastening body, and a plurality of weighted masses. The inner body has a hollow interior area and an aperture in communication with the interior area and adapted to receive the shaft. The outer body has a hollow interior area defined therethrough, and at least one radial race defined in the interior area. The outer body is attachable to the inner body. The fastening body has a hollow interior area, and is configured to be received into the interior area of the inner body. The interior area of the fastening body assembly is adapted to engage with the shaft received through the inner body thereby securing the rotating object dynamic balancing system to the rotating object.

20 Claims, 20 Drawing Sheets

(56) References Cited

U.S. PATENT DOCUMENTS

| | | | |
|---|---|---|---|
| 4,905,776 A | 3/1990 | Beynet et al. | |
| 5,111,713 A | 5/1992 | Cameron et al. | |
| 5,142,936 A * | 9/1992 | McGale | 74/570.2 |
| 5,460,017 A | 10/1995 | Taylor | |
| 5,605,078 A | 2/1997 | Taylor et al. | |
| 5,613,408 A | 3/1997 | Taylor et al. | |
| 5,676,025 A * | 10/1997 | Lulay | 74/570.2 |
| 5,690,017 A * | 11/1997 | Riedlinger | 92/100 |
| 5,724,862 A * | 3/1998 | Hannah et al. | 74/570.2 |
| 5,768,951 A | 6/1998 | Hannah et al. | |
| 5,813,253 A * | 9/1998 | Uhlin | 68/23.2 |
| 5,816,115 A | 10/1998 | Taylor et al. | |
| 5,829,318 A * | 11/1998 | Hannah et al. | 74/570.2 |
| 5,845,542 A | 12/1998 | Hannah et al. | |
| 5,850,748 A | 12/1998 | Kim et al. | |
| 5,919,036 A | 7/1999 | O'Brien et al. | |
| 5,941,133 A * | 8/1999 | Wierzba et al. | 74/570.2 |
| 5,967,243 A * | 10/1999 | Jacobsson | 173/216 |
| 5,997,284 A | 12/1999 | Gustafson et al. | |
| 6,035,758 A | 3/2000 | Taylor et al. | |
| 6,082,151 A | 7/2000 | Wierzba et al. | |
| 6,213,717 B1 * | 4/2001 | Bucher et al. | 416/145 |
| 6,321,627 B1 | 11/2001 | Taylor et al. | |
| 6,439,003 B1 * | 8/2002 | Uhlin | 68/23.2 |
| 6,719,374 B2 * | 4/2004 | Johnson | 301/5.22 |
| 6,974,362 B2 | 12/2005 | Lindell et al. | |
| 6,979,060 B2 * | 12/2005 | Fogal et al. | 301/5.22 |
| 7,159,952 B2 * | 1/2007 | Koschel et al. | 301/5.22 |
| 7,342,331 B2 * | 3/2008 | Down et al. | 310/51 |
| 3,164,413 A1 | 11/2008 | Salathiel | |
| 7,717,013 B2 * | 5/2010 | Hildebrand et al. | 74/574.2 |
| 8,051,710 B2 * | 11/2011 | Van Dam et al. | 73/468 |
| 2006/0005623 A1 * | 1/2006 | Hildebrand et al. | 73/468 |

\* cited by examiner

ROTATING OBJECT DYNAMIC BALANCING SYSTEM AND METHOD

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of the Invention

The present invention relates to a rotating object dynamic balancing system and method having particular utility in connection with dynamically balancing an out of balance condition of an object or hub mounted on a rotating shaft.

2. Description of the Prior Art

Rotating machinery is never perfectly balanced, and inevitably with the passage of time and use, increasing imperfections of balance cause increasing levels of vibration. Increasing vibration leads to undesirable effects, such as power loss, increased noise, increased wear and early failure of components. Decreasing the vibration by partially or fully restoring balance, reduces these undesirable effects, and so providing a device that is easily attachable to an existing shaft or hub provides a means by which a fan, impeller, mixer, propeller or other parts of the rotating assembly likely to degrade in balance can gain from these desirable benefits.

It is known in the art of millwrighting to apply static weights to balance rotating systems. It is also known that rotating objects generate great vibrations when the speed of the rotating object reaches a resonant speed (i.e., when the rotating object speed coincides with a natural frequency of the rotating system). When the rotating object speed is less than the resonant speed, the center of gravity of the rotating system is offset from the center of the rotating object. When the rotating object speed exceeds the resonant speed, the phase of vibration of the rotating system is shifted 180°, so that the center of gravity of the rotating system is shifted to the center of rotation from the center of the rotating object.

Such prior art balancers generally include a counterweight having a weight of fixed value which is located at a determined position from the axis of rotation to help oppose an imbalance in the rotating body. The magnitude of the imbalance can generally be measured and, accordingly, the necessary weight and position of the counterweight can be calculated so that the weight is positioned where it will act to help counter the newly determined position and magnitude of imbalance. This strategy ceases to perform satisfactorily where imbalances are either slowly or rapidly changing, or where the imbalance is finer than is practical to balance statically.

Marine propellers are sometimes constructed by fastening individually fabricated blades to a hub. This is always the case with controllable pitch propellers (CP propellers) and can also be the case with propellers having fixed blades. Like any rotating device, it is desirable that a marine propeller be balanced to minimize vibration and thereby prevent undesirable loadings of the propeller components, the ship's shafting, the shaft seals, bearings and mountings, and to minimize noise and power loss. The blades of built-up marine propellers are usually hand-finished and are balanced against a standard blade weight by removing material from the blade surfaces. The resulting blades often deviate somewhat from the desired profile, which results in small, but nonetheless undesirable, differences in hydrodynamic performance among the blades.

The effect on the balance of the assembly by installing or removing balance masses on the hub or blades is, of course, a function of the masses of the balance members and the distances of the balance members from the axis of rotation of the shaft. When balance members are installed in the blade flanges, the distance from the propeller axis is relatively small, and balance members with relatively large masses (high weights) are required. To minimize the masses of the balance members, it has been conventional to balance the blades in sets and to install them as sets on the hub. For both balancing and installation, the blades are arranged in a sequence, based on their weights, that will make the propeller most closely balanced before balance members are added and minimize the sizes and the number of balance members required to achieve balance. An important disadvantage of statically balancing the blades in sets is that they have to be installed and used in matched sets. If one or more, but less than all, of the blades of a propeller have to be replaced for some reason, it is a practical necessity to change the whole set, as the static balancing is typically done at an offsite location with specialized equipment.

Furthermore, balanced blades can be damaged during use by impacting an object by wear, by corrosion, marine growth, repainting or repairing, and therefore place the blades in an unbalanced state.

Conventionally, correction for ship propeller shafting systems vibrations due to such causes as damage to the propeller or shaft or misalignment of bearings supporting the shaft require dry-docking of the ship and balancing of the propeller and dunce cap, together with replacement of the seals and bearings, aligning of bearings or straightening of the shaft if required. Such operations are costly and time consuming and require inactivation of the ship for some period of time.

While the above-described devices and repair procedures fulfill their respective objectives to partially or substantially correct imbalances due to damage or wear, the repairs are static and therefore do nothing to further counteract subsequent sources of imbalances, they do not describe a rotating object dynamic balancing system and method that allows for unattended and automatic dynamic balancing of any hub mounted blade, and in particular the unattended and automatic dynamic balancing of a marine propeller.

Therefore, a need exists for a new and improved rotating object dynamic balancing system and method that can be used for dynamically balancing a marine propeller. In this regard, the present invention substantially fulfills this need. In this respect, the rotating object dynamic balancing system and method according to the present invention substantially departs from the conventional concepts and designs of the prior art, and in doing so provide an apparatus initially developed for the purpose of dynamically balancing a marine propeller, but also useful and desirable for balancing various shaft mounted devices.

SUMMARY OF THE INVENTION

In view of the foregoing disadvantages inherent in the known methods of static balancing now present in the prior art, the present invention provides an improved rotating object dynamic balancing system and method, and overcomes the above-mentioned disadvantages and drawbacks of the prior art. As such, the general purpose of the present invention, which will be described subsequently in greater detail, is to provide a new and improved rotating object dynamic balancing system and method which has all the advantages of the prior art mentioned heretofore and many novel features that result in a rotating object dynamic balancing system which is not anticipated, rendered obvious, suggested, or even implied by the prior art, either alone or in any combination thereof.

To attain this, the present invention essentially comprises an inner body, an outer body, a fastening body, and at least one weighted mass. The inner body has a hollow interior area and an aperture in communication with the interior area and adapted to removably attach to a rotating shaft, hub or object. The outer body has a hollow interior area defined through the outer body, and at least one radial race defined in the interior area. The outer body is attachable to the inner body. The fastening body has a hollow interior area, and is configured to be received into the interior area of the inner body. The interior area of the fastening body is adapted to removably engage with the shaft received through the aperture of the inner body thereby securing the rotating object dynamic balancing system to the rotating object. The weighted mass is configured and sized to be received in and travel along a race of the outer body.

The rotating object dynamic balancing system of the present invention can additionally contain a tail cone attachable to the fastening body or inner body. The tail cone is configured to be received into the interior area of the inner body, and the interior area of the tail cone is sized to receive the fastening body. Alternatively, the tail cone and fastening body can be beneficially combined into one unit.

There has thus been outlined, rather broadly, the more important features of the invention in order that the detailed description thereof that follows may be better understood and in order that the present contribution to the art may be better appreciated.

The invention may also include an inner body extension projection out from a mating ending of the inner body. The inner body extension includes a keyed or splined interior area therethrough in commensuration with the aperture of the inner body. The splined interior area is configured to engage with and receive a splined section of the shaft. Alternately, the inner body assembly can have an extension projecting out from one end thereof. The extension includes a splined interior area defined there through and in communication with the aperture of the inner body assembly. The splined interior area of the extension is configured to engage with and receive a splined section of a shaft of the rotating object. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rotating object dynamic balancing system and method that has all of the advantages of the prior art balancers and none of the disadvantages.

It is another object of the present invention to provide a new and improved rotating object dynamic balancing system that may be easily and efficiently manufactured and marketed.

An even further object of the present invention is to provide a new and improved rotating object dynamic balancing system and method that has a low cost of manufacture with regard to both materials and labor, and which accordingly is then susceptible of low prices of sale to the consuming public, thereby making such rotating object dynamic balancing system and method economically available to the buying public.

Still another object of the present invention is to provide a new rotating object dynamic balancing system and method that provides in the apparatuses and methods of the prior art some of the advantages thereof, while simultaneously overcoming some of the disadvantages normally associated therewith.

Even still another object of the present invention is to provide a rotating object dynamic balancing system and method for dynamically balancing a propeller. This allows for the propeller to be easily, effectively and dynamically balanced, thereby reducing vibration, noise, and damage due to vibration fatigue.

Lastly, it is an object of the present invention to provide a new and improved method of balancing a propeller by providing a rotating object dynamic balancing system having an inner body connected to a rotating object, an outer body, a fastening body, and a tail cone. The outer body is provided with a plurality of weighted masses that travel along at least one radial race. Rotation of the rotating object dynamic balancing system, due to rotation of the rotating object, produces a centrifugal force on the weighted masses perpendicular to the longitudinal axis of the rotating object dynamic balancing system and the rotating object. The weighted masses are automatically distributed along the race by response of the weighted masses to transverse vibration. The weighted masses may assume a suitable distribution acting to cancel or partially counteract the unbalance of the remainder of the rotating object.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
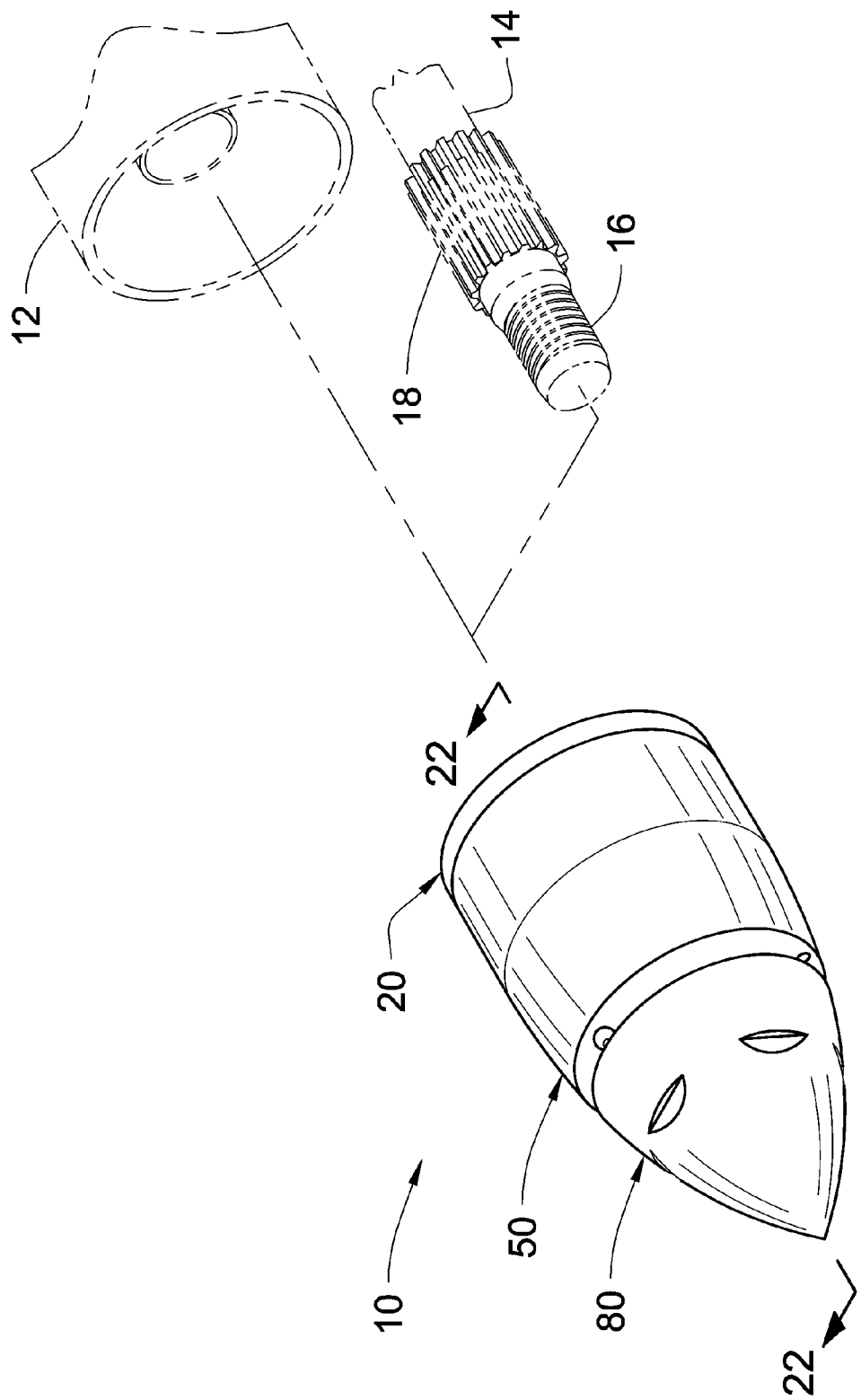
FIG. 1 is a perspective view of an embodiment of the rotating object dynamic balancing system and method constructed in accordance with the principles of the present invention, with the phantom lines depicting environmental structure and forming no part of the claimed invention.

Referring now to the drawings and particularly to FIGS. 1-29, an embodiment of the rotating object dynamic balancing system and method of the present invention is shown and generally designated by the reference numeral 10.

In FIG. 1, a new and improved rotating object dynamic balancing system 10 of the present invention for dynamically balancing a rotating object 12 having a rotating shaft 14, is illustrated and will be described. The rotating object 12 can be, but not limited to, a boat or marine propeller, an aircraft propeller, a fan, impeller, mixer, wheel or hub, or any rotating object mounted on or driven by a shaft. More particularly, the rotating object dynamic balancing system 10 has an inner body assembly 20, an outer body assembly 50, a tail cone assembly 80, and a fastening body assembly 100 (illustrated in FIG. 2). The shaft 14 can include at least, as such with but not limited to an outboard or stern drive marine engine and propeller system, a threaded section 16 and a splined section 18, with the threaded section 16 featuring either right or left handed threads. The splined section 18 engages with a corresponding splined bore (not shown) defined in the rotating object or propeller 12 and with a lower drive unit (not shown) of an outboard or stern drive engine. This configuration is standard, and known in the industry. The rotating object dynamic balancing system 10 of the present application removably attaches to the threaded section 16 of the shaft 14, thereby providing a dynamic balancing force on the rotating object 12 attached to the shaft 14. The rotating object dynamic balancing system 10 is positioned substantially concentric with the rotating object 12 and/or the shaft 14. Particularly, the central longitudinal axis of the inner body assembly 20, the outer body assembly 50, the cone assembly 80, and the fastening body assembly 100 are concentrically positioned with the rotating object 12 and/or the shaft 14.

Figure 2:
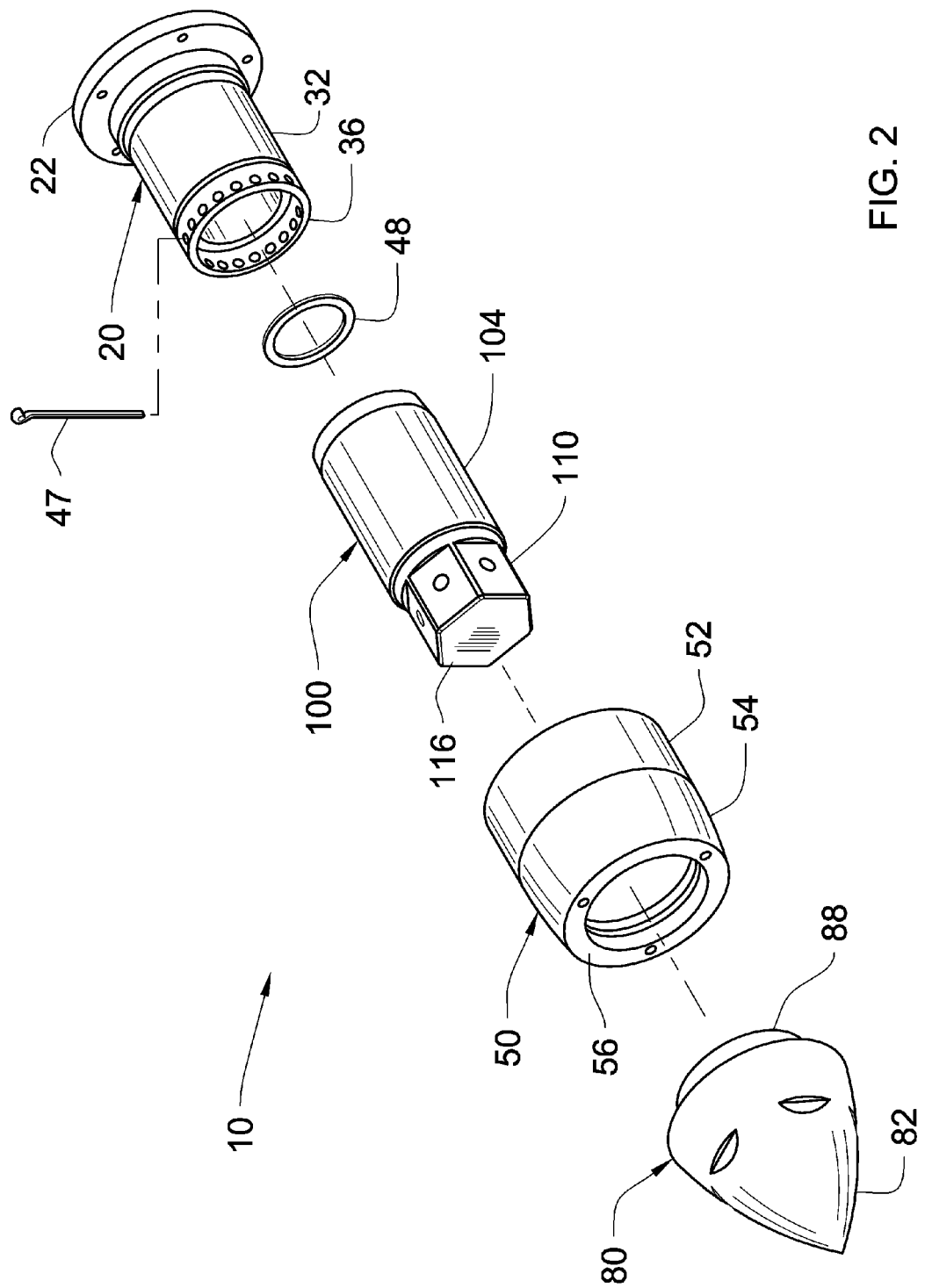
FIG. 2 is an exploded perspective view of the rotating object dynamic balancing system and method of the present invention.
Figure 3:
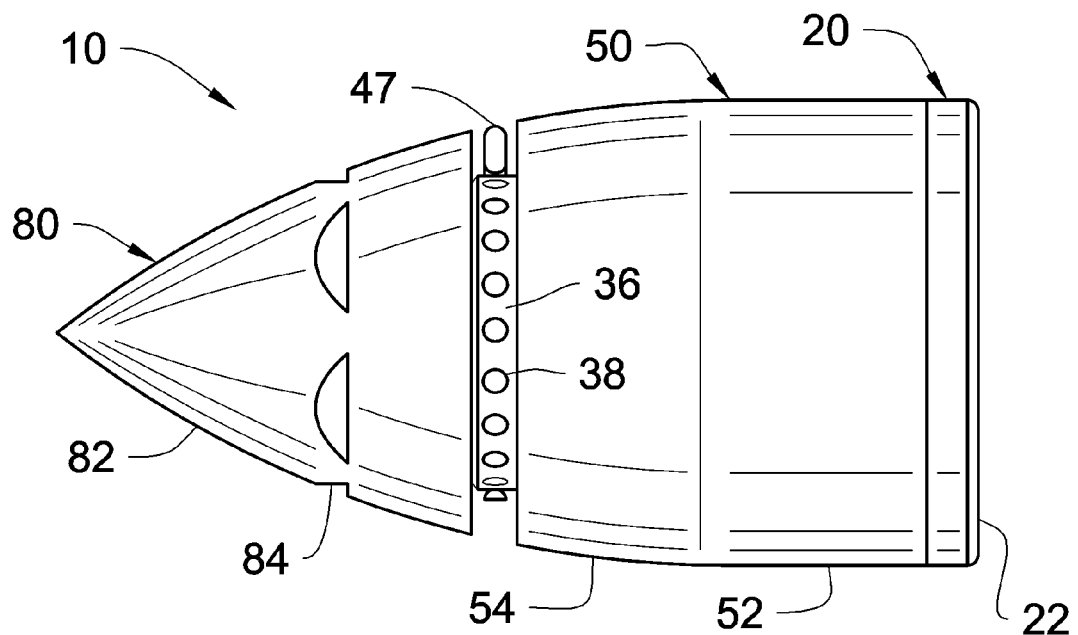
FIG. 3 is a side plane view of the rotating object dynamic balancing system and method of the present invention.
Figure 4:
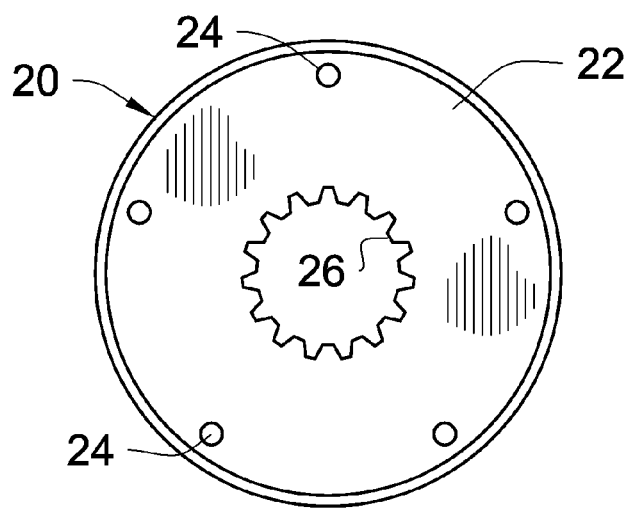
FIG. 4 is a back plane view of the rotating object dynamic balancing system and method of the present invention.

As best illustrated in FIGS. 2 and 3, the fastening body assembly 100 is removably inserted into the interior of the inner body assembly 20, and an optional washer 48 is positioned between the fastening body assembly 100 and the interior of the inner body assembly 20. The assembled inner body 20 and fastening body 100 assemblies are inserted into the interior of the outer body assembly 50. The tail cone assembly 80 is inserted into the inner and outer body assemblies 20, 50. A cotter pin 47 secures the inner body assembly 20, the fastening body assembly 100, and the tail cone assembly 80 together. It can be appreciated that other types of fasteners, such as but not limited to screws, bolts, clips, clamps, or the like, can be used in place of the cotter pin 47.

The rotating object dynamic balancing system 10 has a substantially bullet-like or ballistic configuration when assembled, with a substantially cylindrical cross-section, as best illustrated in FIG. 3. The inner body assembly 20 includes a flanged mounting section 22, located adjacent the outer body assembly 50 when assembled, and an aperture 26 defined through the flanged mounting section 22. The aperture 26 can be, but not limited to, splined, threaded, notched, keyed, or smooth, and is substantially configured to receive a free portion of the shaft 14 that extends out from the rotating object 12. Alternatively, the flanged mounting section 22 can be directly and removably fixed to the rotating object 12. The threaded section 16 of the shaft 14 is threadably engaged with the fastening body assembly 100 thereby securing the rotating object dynamic balancing system 10 to the shaft 14, and providing dynamic balancing of the rotating object 12 when rotated by the shaft 14.

Figure 5:
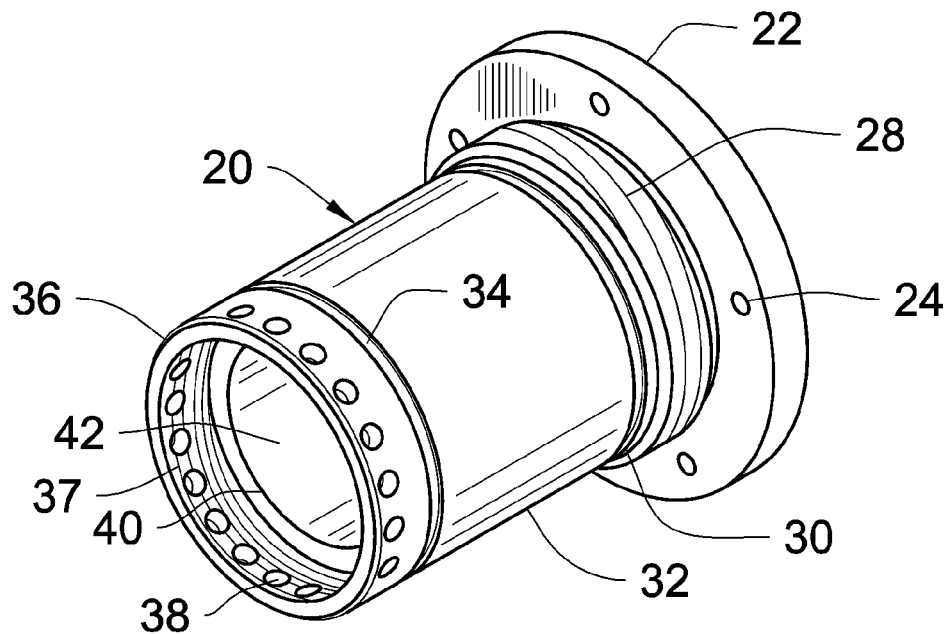
FIG. 5 is a left perspective view of the inner body of the rotating object dynamic balancing system and method of the present invention.
Figure 6:
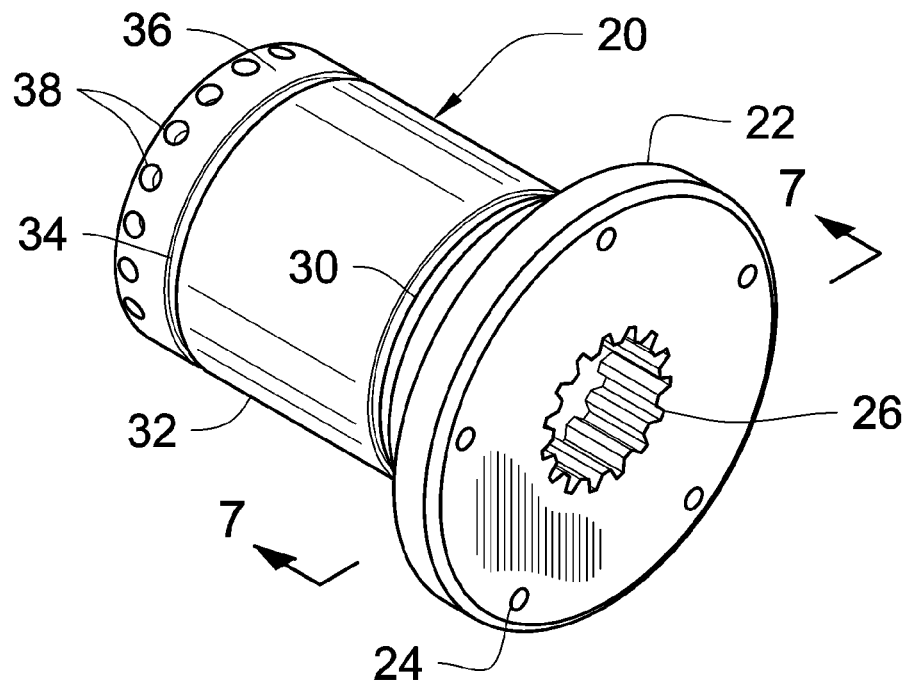
FIG. 6 is a right perspective view of the inner body of the rotating object dynamic balancing system and method of the present invention.
Figure 7:
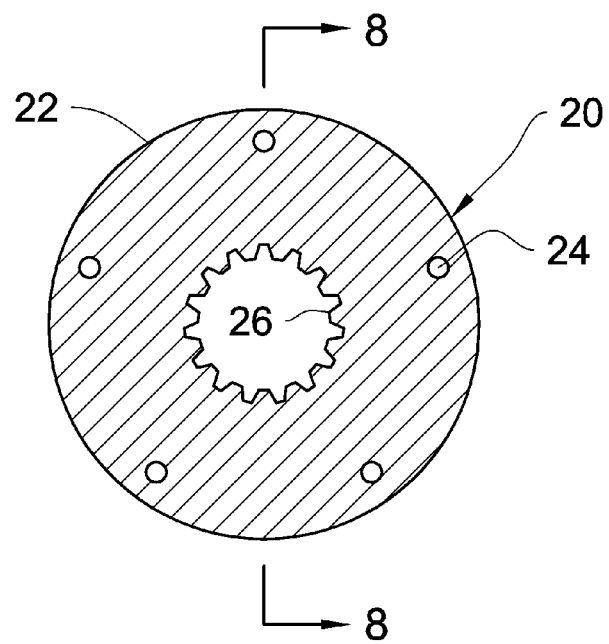
FIG. 7 is a cross-sectional view of the inner body of the rotating object dynamic balancing system and method of the present invention taken along line 7-7 in FIG. 6.

FIGS. 5 and 6 are perspective views of the inner body assembly 20 of the rotating object dynamic balancing system and method 10. The inner body assembly 20 broadly includes a flanged mounting section 22, a cylindrical mid section 32, and a free end section 36, all of which having a generally hollow cylindrical configuration. The cylindrical mid section 32 defines a hollow interior area 42 in communication with the hollow interiors of the flanged mounting section 22 and the free end section 36. The inner body assembly 20 can be manufactured, cast, machined or made from stainless steel, aluminum, brass, metal alloys, or any non-corroding or non-oxidizing materials.

The flanged mounting section 22 includes a plurality of bores 24 defined therethrough and located radially around a longitudinal and central axis of the inner body assembly 20, with the bores 24 being parallel with the longitudinal axis and central axis of the inner body assembly 20. The bores 24 are located toward the outer circumferential edge of the flanged mounting section 22, and are each configured to engage with or receive a fastener or pin 45. The fastener 45 can be, but not limited to, a roll pin, a threaded fastener, a clip, a clamp, and the like. The fastener 45 can be used to permanently or removably connect the flanged mounting section 22 to the rotating object 12.

Figure 8:
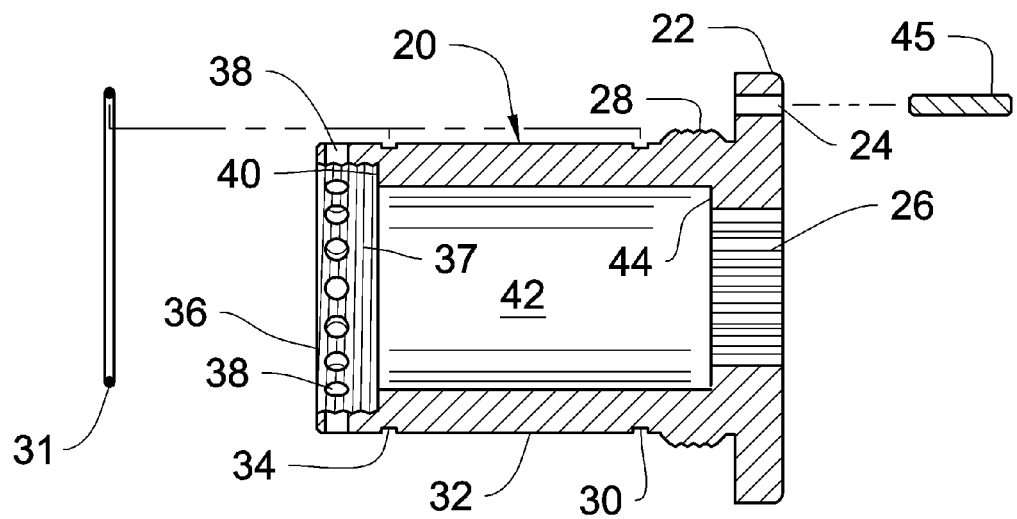
FIG. 8 is a cross-sectional view of the inner body of the rotating object dynamic balancing system and method of the present invention taken along line 8-8 in FIG. 7.

The aperture 26 of the flanged mounting section 22 has a diameter less than the diameter of the interior area 42 of the cylindrical mid section 32, thereby producing an edge 44, as best illustrated in FIG. 8. The edge 44 is substantially perpendicular to the longitudinal and central axis of the inner body assembly 20. The aperture 26 can be splined or configured to correspond to the splined section 18 of the shaft 14.

Figure 26:
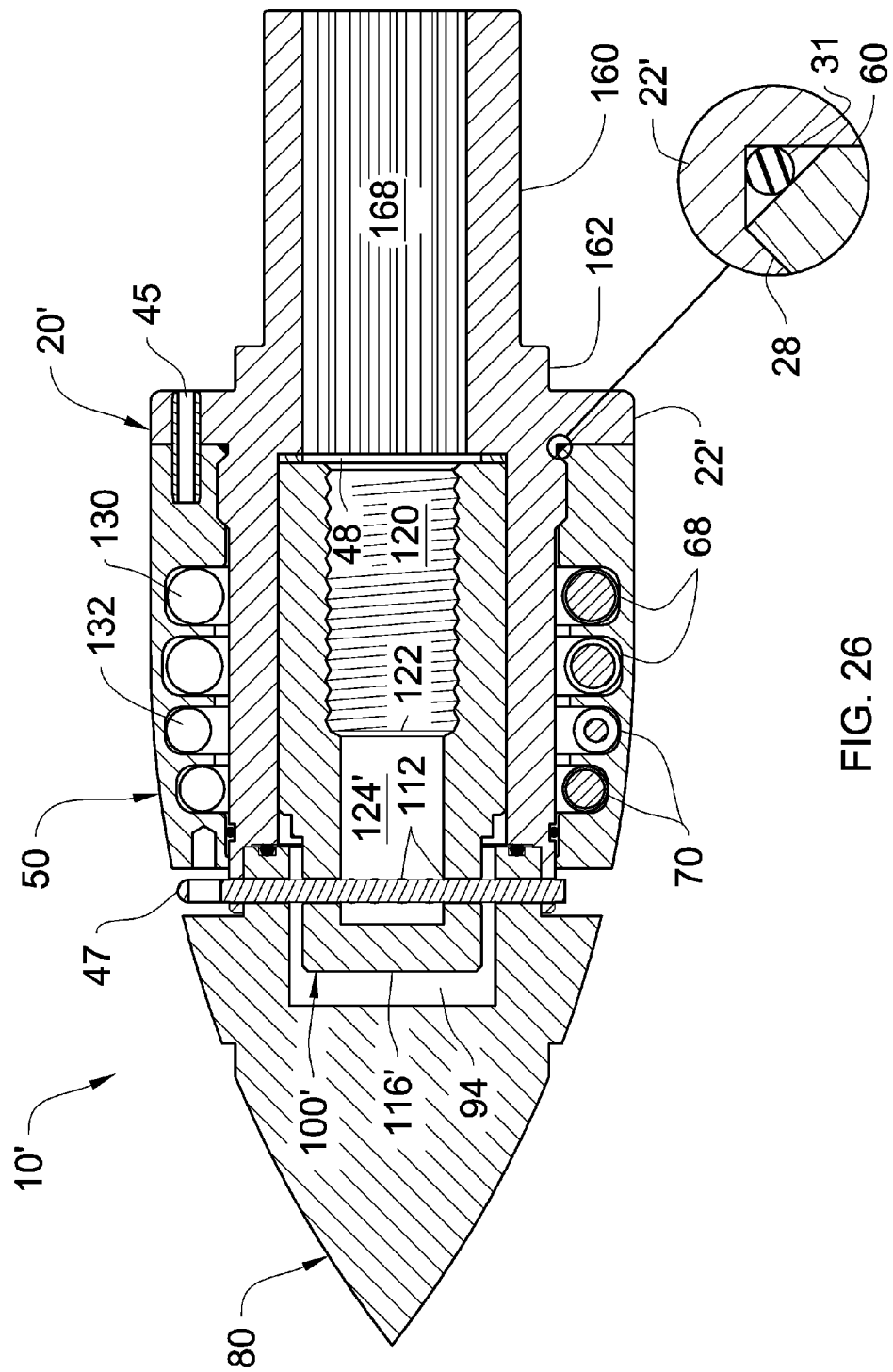
FIG. 26 is a cross-sectional view of an assembled rotating object dynamic balancing system and method containing the alternate embodiment inner body assembly and fastening body assembly of the present invention.

The inner body assembly 20 further includes an external threaded section 28 located adjacent the flanged mounting section 22 toward the cylindrical mid section 30 and has a diameter greater than the cylindrical mid section 32. A first exterior groove 30 is defined and located between the external threaded section 28 and the cylindrical mid section 32. A second exterior groove 34 is defined and located adjacent the cylindrical mid section 32 opposite the first exterior groove 30, thereby defining the first and second grooves 30, 34 on both ends of the cylindrical mid section 32. The first and second grooves 30, 34 are each configured to removably and securely receive an o-ring or sealing gasket 31, respectively. The external threaded section 28 features either right or left handed threads. Alternatively, the first exterior groove 30 can be removed, and its o-ring 31 can be positioned between the external threaded section 28 and the flanged mounting section 22, as best illustrated in FIG. 26.

The free end section 36 is adjacent to the second exterior groove 34 and includes a generally cylindrical configuration. A plurality of bores 38 are radially located along the circumference of the free end section 36 and defined therethrough in communication with its hollow interior. The bores 38 are adapted and configured to receive a fastener or pin 47 therethrough, and are oriented so that each bore 38 has a corresponding bore oppositely aligned therewith. The fastener or pin 47 can be, but not limited to, a threaded fastener, a cotter pin, a clip, a clamp, and the like. The hollow interior of the free end section 36 has a diameter greater than the diameter of the interior area 42 of the cylindrical mid section 32, this difference in diameters produces an edge 40 that is perpendicular to the longitudinal axis of the inner body assembly 20. An internal threaded section 37 is located in the hollow section of the free end section 36, as best illustrated in FIG. 8. The internal threaded section 37 features either right or left handed threads.

Figure 9:
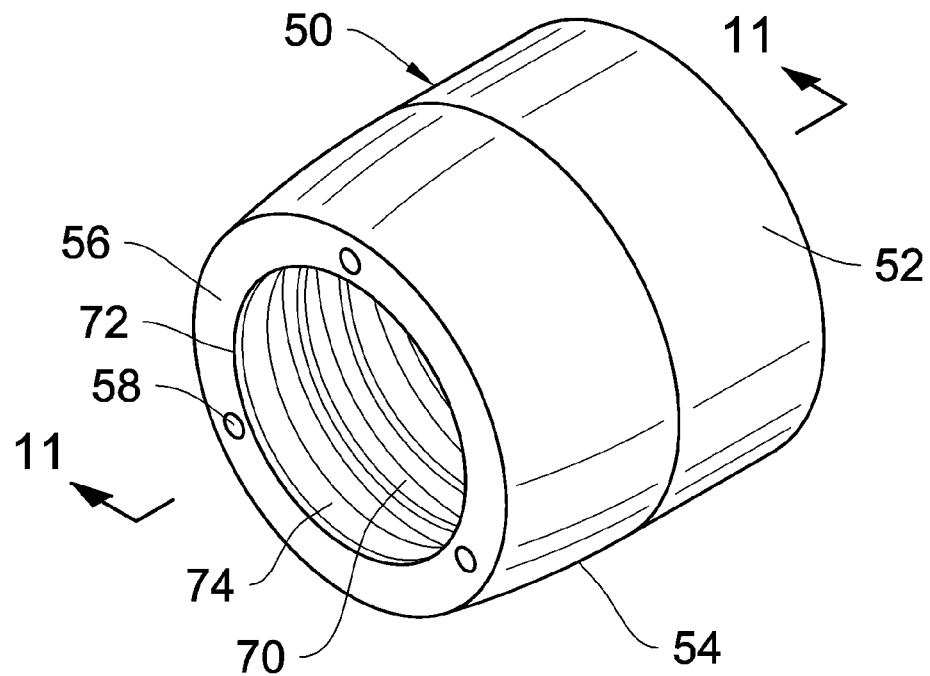
FIG. 9 is a left perspective view of the outer body of the rotating object dynamic balancing system and method of the present invention.
Figure 10:
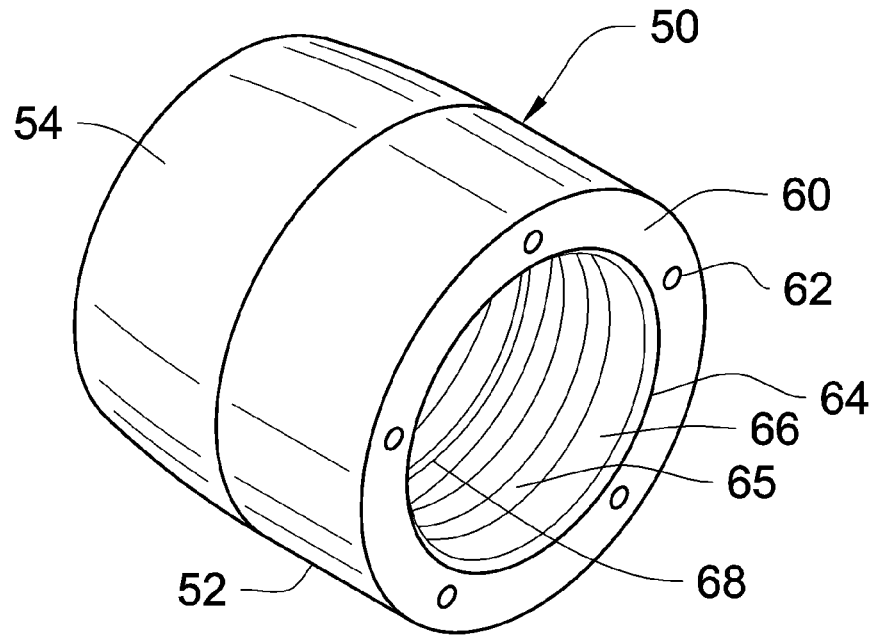
FIG. 10 is a right perspective view of the outer body of the rotating object dynamic balancing system and method of the present invention.

FIGS. 9 and 10 are perspective views of the outer body assembly 50 of the rotating object dynamic balancing system 10. The outer body assembly 50 broadly includes a cylindrical mounting section 52 and a cylindrical, tapered or conical free end section 54 adjacent thereto. Both the cylindrical mounting section 52 and the tapered free end section 54 define a hollow interior sized to receive the external threaded section 28, the cylindrical mid section 32, and the free end section 36 of the inner body assembly 20 therethrough. The diameter of the cylindrical mounting section 52 is substantially equal to the diameter of the flanged mounting section 22 of the inner body assembly 20. The outer body assembly 50 can be manufactured, cast, machined or made from stainless steel, aluminum, brass, metal alloys, or any non-corroding or non-oxidizing materials.

Figure 11:
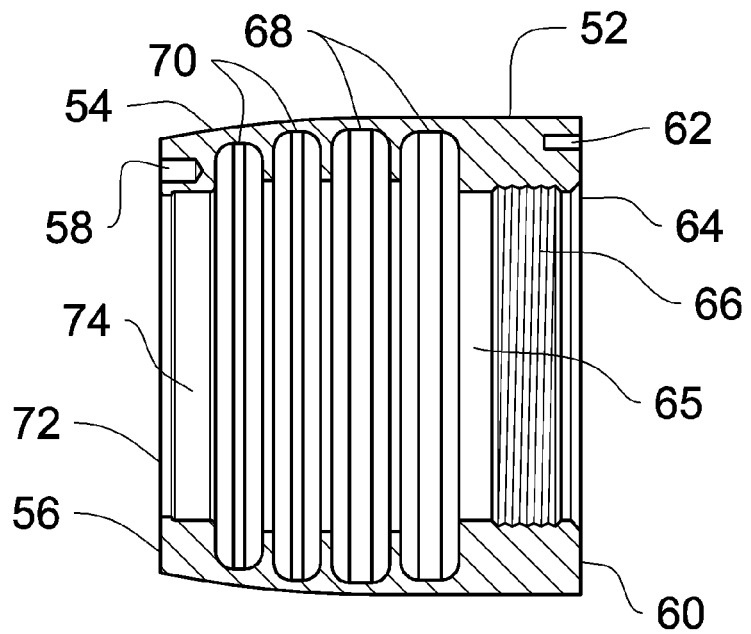
FIG. 11 is a cross-sectional view of the outer body of the rotating object dynamic balancing system and method of the present invention taken along line 11-11 in FIG. 9.

As best illustrated in FIG. 11, the cylindrical mounting section 52 includes a mounting end face 60, a mounting section aperture 64 defined in the mounting end face 60, an internal threaded section 66, a first sealing surface 65, and at least one race 68. The mounting end face 60 is substantially perpendicular to the longitudinal axis of the outer body assembly 50, and includes a plurality of bores 62 defined therein and located radially around a central axis of the outer body assembly 50, with the longitudinal axis of the bores 62 being parallel with the longitudinal axis and central axis of the outer body assembly 50. The location of each bore 62 in reference to the longitudinal and central axis of the outer body assembly 50 corresponds with the location of the bores 24 of the flanged mounting section 22 of the inner body assembly 20 from its corresponding longitudinal axis. Hence, the bores 62 of the outer body assembly 50 are substantially aligned with the bores 25 of the inner body assembly 20 when the inner and outer body assemblies 20, 50 share the same longitudinal axis. The mounting section aperture 64 is concentric with the longitudinal axis of the outer body assembly 50 and is chamfered to receive the external threaded section 28, the cylindrical mid section 32, and the free end section 36 of the inner body assembly 20 therethrough. Each of the bores 62 of the mounting end face 60 are sized to receive the remainder of a corresponding fastener or pin 45 that extends past the bore 24 of the flanged mounting section 22 of the inner body assembly 20 when inserted therethrough.

The internal threaded section 66 of the outer body assembly 50 features a plurality of either right or left handed threads internally directed towards the longitudinal and central axis of the outer body assembly 50. The internal threaded section 66 is adapted to threadably engage with the external threaded section 28 of the inner body assembly 20, thereby removably securing the outer body assembly 50 to the inner body assembly 20.

The first sealing surface 65 is a smooth internal cylindrical surface sized to make sealing contact with the o-ring 31 positioned in the first groove 30 of the inner body assembly 20, or in the alternative to the o-ring 31 located between the external threaded section 28 and the flanged mounting section 22.

The race(s) 68 is a radially defined race that extends into the cylindrical mounting section 52. It can be appreciated that many races can be formed into the cylindrical mounting section 52, and that the size and configuration of the race 68 can have varying configurations, wherein multiple concentric races can be arranged adjacent to each other. The mounting race 68 is adapted to receive a plurality of weighted masses 130 (shown in FIG. 20), and is sized to allow the weighted masses 130 to travel radially along the mounting race 68.

The tapered or conical free end section 54 includes a free end face 56, a free end aperture 72 defined in the free end face 54, a second sealing surface 74, and can include at least one free end race 70. The free end face 56 is substantially perpendicular to the longitudinal axis of the outer body assembly 50, and includes a plurality of bores 58 defined therein and located radially around the longitudinal and central axis of the outer body assembly 50, with the longitudinal axis of the bores 58 being parallel with the longitudinal axis and central axis of the outer body assembly 50. The free end aperture 72 is concentric with the longitudinal axis of the outer body assembly 50 and is adapted to receive the free end section 36 of the inner body assembly 20 therethrough. The bores 58 are adapted to be used by a tool so as to assist the assembly of the outer body assembly 50 to the inner body assembly 20.

The second sealing surface 74 is a smooth internal cylindrical surface sized to make sealing contact with the o-ring 31 positioned in the second groove 34 of the inner body assembly 20.

The free end race(s) 70 is a radially defined race that extends into the tapered free end section 54. It can be appreciated that many races can be formed into the tapered free end section 54, and that the size and configuration of the race 70 can have varying configurations, wherein multiple concentric races can be arranged adjacent to each other. The free end race 70 is adapted to receive a plurality of weighted masses 132 (shown in FIG. 20), and is sized to allow the weighted masses 132 to travel radially along the free end race 70. It can further be appreciated that outer body assembly 50 can feature a single race 68, 70 or a plurality of concentric races located either in the mounting section 52 or the free end section 54.

Figure 12:
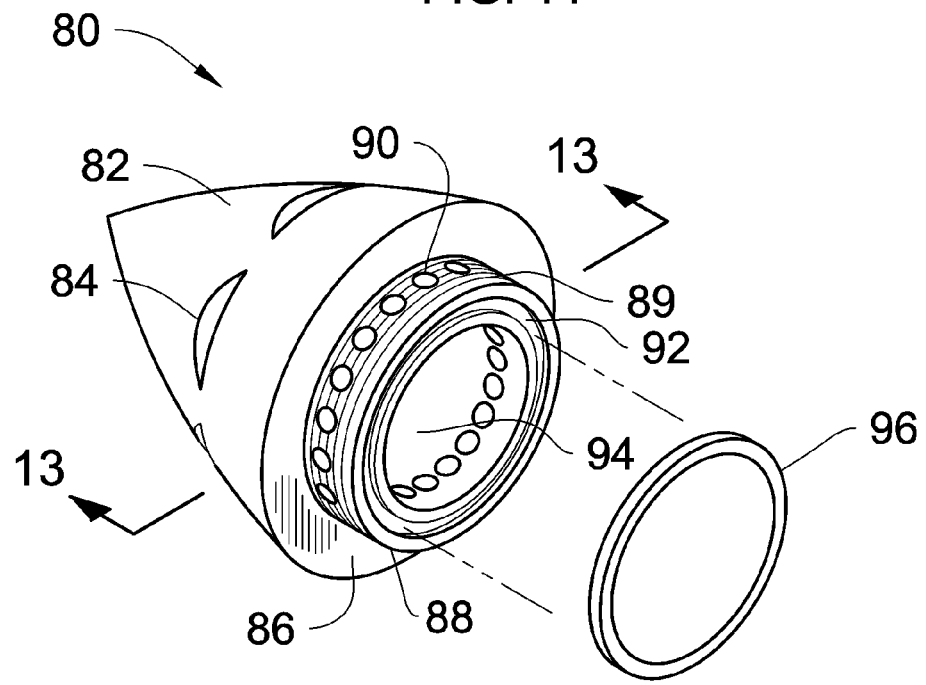
FIG. 12 is a right perspective view of the tail cone of the rotating object dynamic balancing system and method of the present invention.

FIG. 12 is a perspective view of the tail cone assembly 80 of the rotating object dynamic balancing system 10. The tail cone assembly 80 broadly includes a free end body 82, a cylindrical mounting section 88, and a defined interior area 94. The tail cone assembly 80 can be manufactured, machined or made from stainless steel, aluminum, brass, metal alloys, or any non-corroding or non-oxidizing materials.

The free end body 82 has a substantially conical or tapering shape directed away from the cylindrical mounting section 88, and including a plurality of notches 84 radially and equally defined in the exterior of the free end body 82. The notches 84 have a pair of planar and perpendicular faces which are adapted to be received by a wrench-like tool so as to provide a rotational torque to the tail cone assembly 80. The free end body 82 transitions to the cylindrical mounting section 88 by way of an edge 86 that is perpendicular to the longitudinal and central axis of the tail cone assembly 80. The largest outer diameter of the free end body 82 and the edge 86 is substantially equal to the largest diameter of the free end face 56 of the tapered free end section 54 of the outer body assembly 50.

The interior area 94 is defined through the mounting section 88 and into the free end body 82. The interior area 94 has a diameter greater than an outer diameter of a free end section 108 of the fastening body assembly 100, and is configured to receive the free end section 108 of the fastening body assembly 100 therein.

Figure 13:
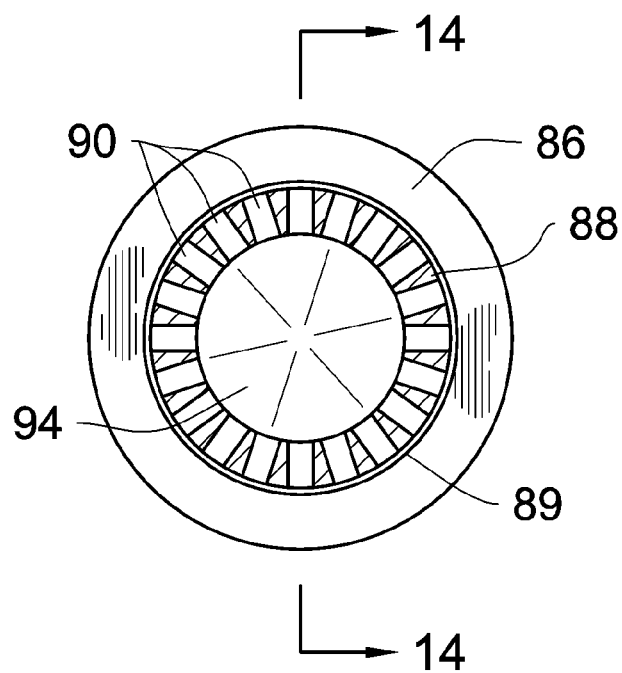
FIG. 13 is a cross-sectional view of the tail cone of the rotating object dynamic balancing system and method of the present invention taken along line 13-13 in FIG. 12.
Figure 14:
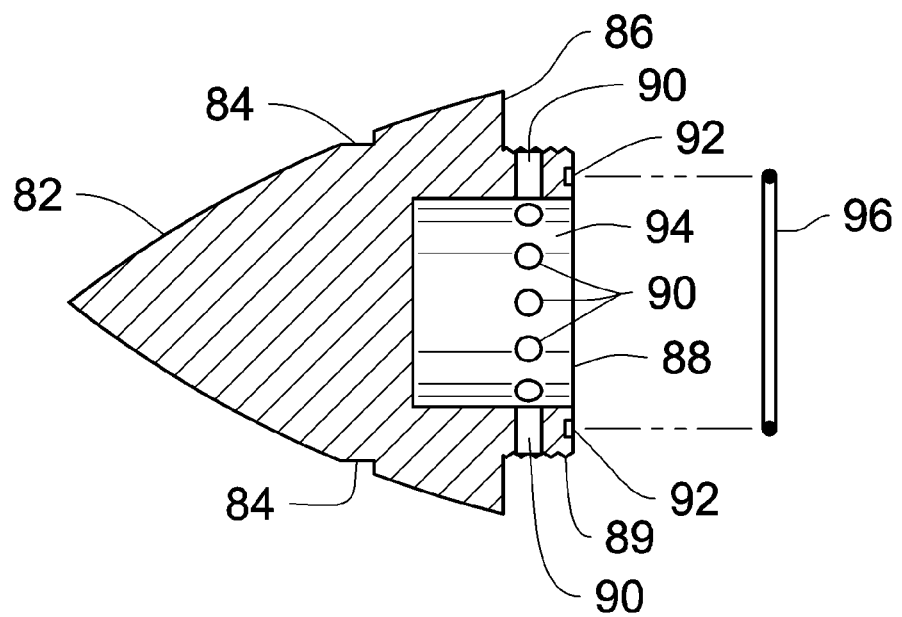
FIG. 14 is a cross-sectional view of the tail cone of the rotating object dynamic balancing system and method of the present invention taken along line 14-14 in FIG. 13.

The cylindrical mounting section 88 includes a plurality of bores 90 adjacent the edge 86, an external threaded section 89 covering the mounting section 88, and a groove 92. The external threaded section 89 features either right or left handed threads. The bores 90 are defined through the mounting section 88 in communication with the interior area 94, and are radially located around the circumference thereof, as best illustrated in FIG. 13. The bores 90 are adapted and configured to receive the fastener or pin 47 therethrough, and are oriented so that each bore 90 has a corresponding bore oppositely aligned therewith. The groove 92 is defined in the mounting section 88 and is orientated perpendicular to the longitudinal and central axis of the tail cone assembly 80. The groove 92 is configured to removably receive an o-ring or sealing gasket 96 therein, as best illustrated in FIGS. 12 and 14.

The outer diameter of the mounting section 88 is less than the inner diameter of the free end section 36 of the inner body assembly 20, so that the o-ring 96 can make contact with the edge 40 of the inner body assembly 20. The external threaded section 89 of the mounting section 88 of the tail cone assembly 80 is adapted to threadably engage with the internal threaded section 37 of the free end section 36 of the inner body assembly 20. The bores 90 of the mounting section 88 of the tail cone assembly 80 are radially located at a distance from a free end of the mounting section 88 that is substantially equal to the distance of the bores 38 of the inner body assembly 20 from the edge 40 of the free end section 36 the inner body assembly 20.

Figure 15:
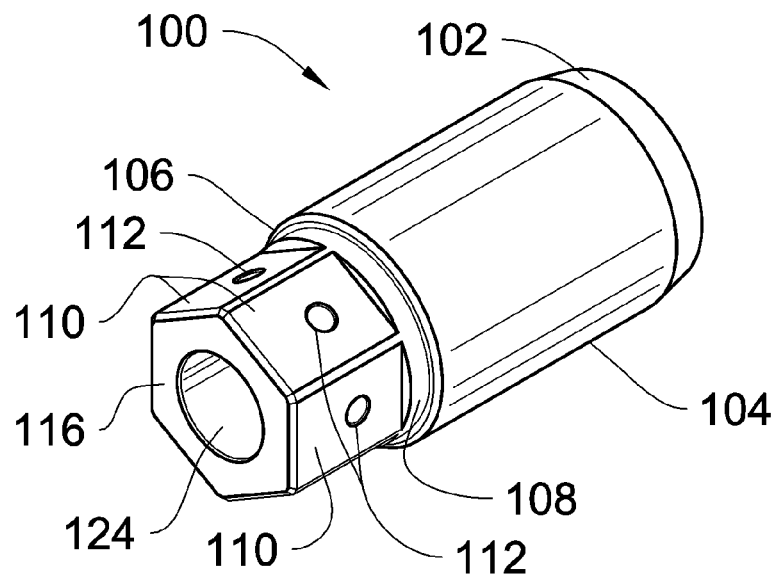
FIG. 15 is a left perspective view of the fastening body of the rotating object dynamic balancing system and method of the present invention
Figure 16:
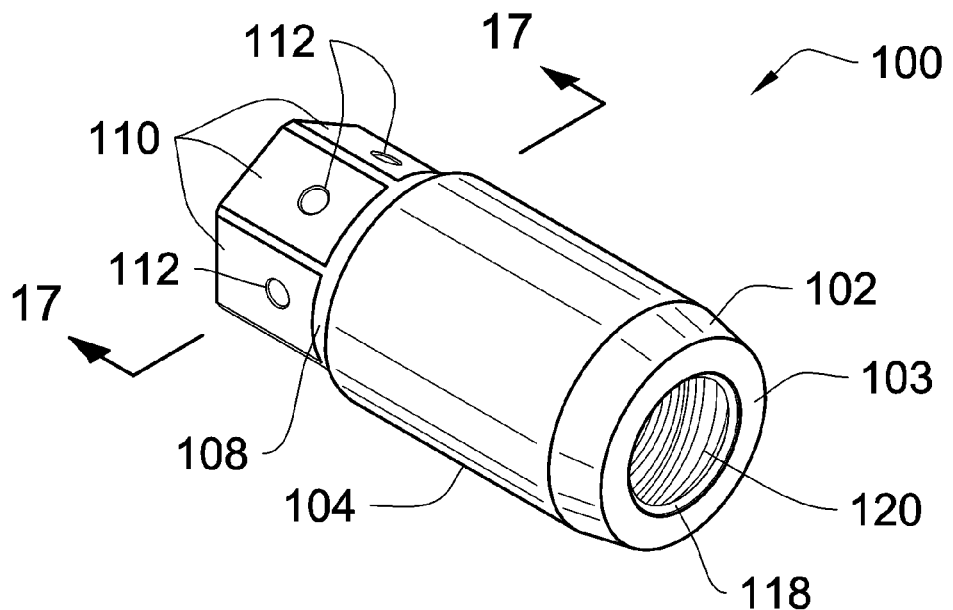
FIG. 16 is a right perspective view of the fastening body of the rotating object dynamic balancing system and method of the present invention.

FIGS. 15 and 16 are perspective views of the fastening body assembly 100 of the rotating object dynamic balancing system 10. The fastening body assembly 100 broadly includes a tapered mounting section 102, a cylindrical mid section 104, a free end section 108 having a generally polygonal configuration made up of a plurality of adjacent planar surfaces 110, and a threaded internal area 120. The tapered mounting section 102 includes a mounting end face 103 perpendicular to the longitudinal and central axis of the fastening body assembly 100, and a chamfered aperture 118. The fastening body assembly 100 can be manufactured, cast, machined or made from stainless steel, aluminum, brass, metal alloys, or any non-corroding or non-oxidizing materials.

Figure 18:
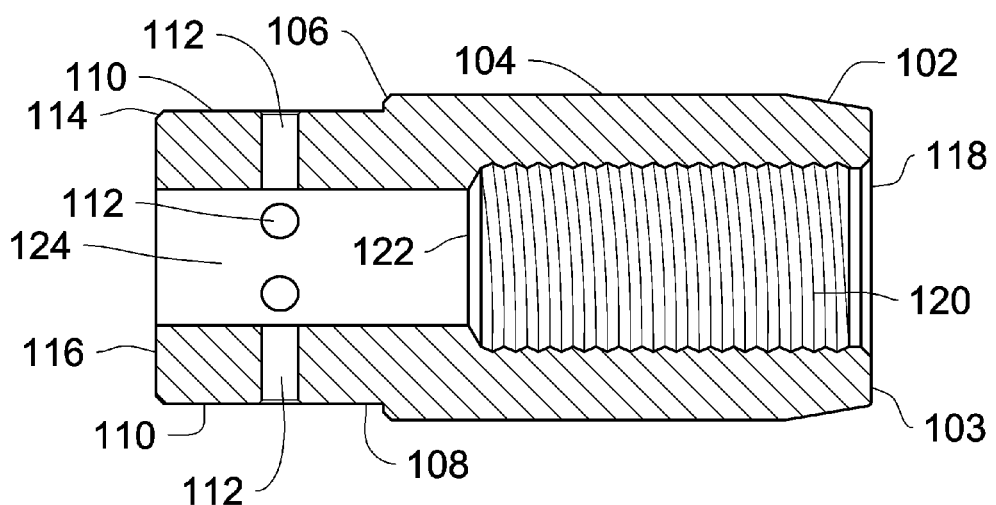
FIG. 18 is a cross-sectional view of the fastening body of the rotating object dynamic balancing system and method of the present invention taken along line 18-18 in FIG. 17.

The cylindrical mid section 104 is adjacent to the largest diameter of the tapered mounting section 102, and has a diameter less than the diameter of the interior area 42 of the inner body assembly 20. The threaded internal area 120 runs from the chamfered aperture 118 and into the cylindrical mid section 104, and which features either right or left handed threads, as best illustrated in FIG. 18. The threaded internal area 120 is adapted to engage with the threaded section 16 of the shaft 14 or with an external threaded section (not shown) of the rotating object 12. A tapered interior area 122 is defined in the cylindrical mid-section adjacent the end of the threaded internal area 120 opposite the chamfered aperture 118. A cylindrical interior area 124 is defined from the free end of the tapered interior area 124 through the free end section 108.

Figure 17:
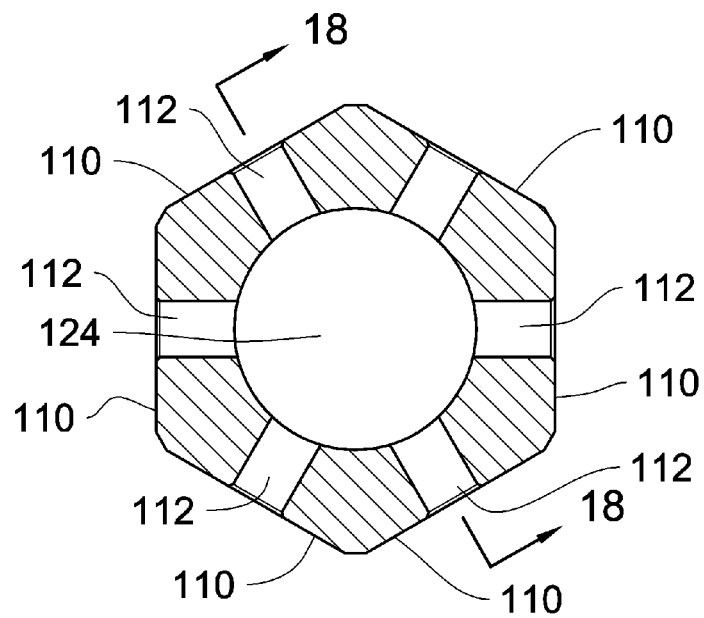
FIG. 17 is a cross-sectional view of the fastening body of the rotating object dynamic balancing system and method of the present invention taken along line 17-17 in FIG. 16.

A chamfered edge 106 transitions from the cylindrical mid section 104 to the free end section 108. The free end section 108 includes the plurality of planar surfaces 110 each featuring a bore 112 therethrough, and a free end face 116. The planar surfaces 110 and their corresponding bores 112 are located in a radial orientation about the longitudinal and central axis of the fastening body assembly 100, thereby forming a polygon. FIG. 17 illustrates six planar surfaces 110 producing a hexagon, but it can be appreciated that any number of planar surfaces 110 can be used. The planar surfaces 110 are adapted to be engaged by a wrench, pliers, or socket tool, so as to provide a rotational motion to the fastening body assembly 100 thereby assembling the fastening body assembly 100 to the shaft 14 or the rotating object 12. The free end section 108 is sized to be received in the interior area 94 of the tail cone assembly 80.

Each bore 112 of the planar surfaces 110 is defined through its corresponding planar surface 110 so as to be in communication with the cylindrical interior area 124. The cylindrical interior area 124 is defined through the free end section 108 so as to produce an aperture in the free end face 116, allowing for water to escape therefrom and to prevent hydraulic locking of the fastening body assembly 100.

Figure 19:
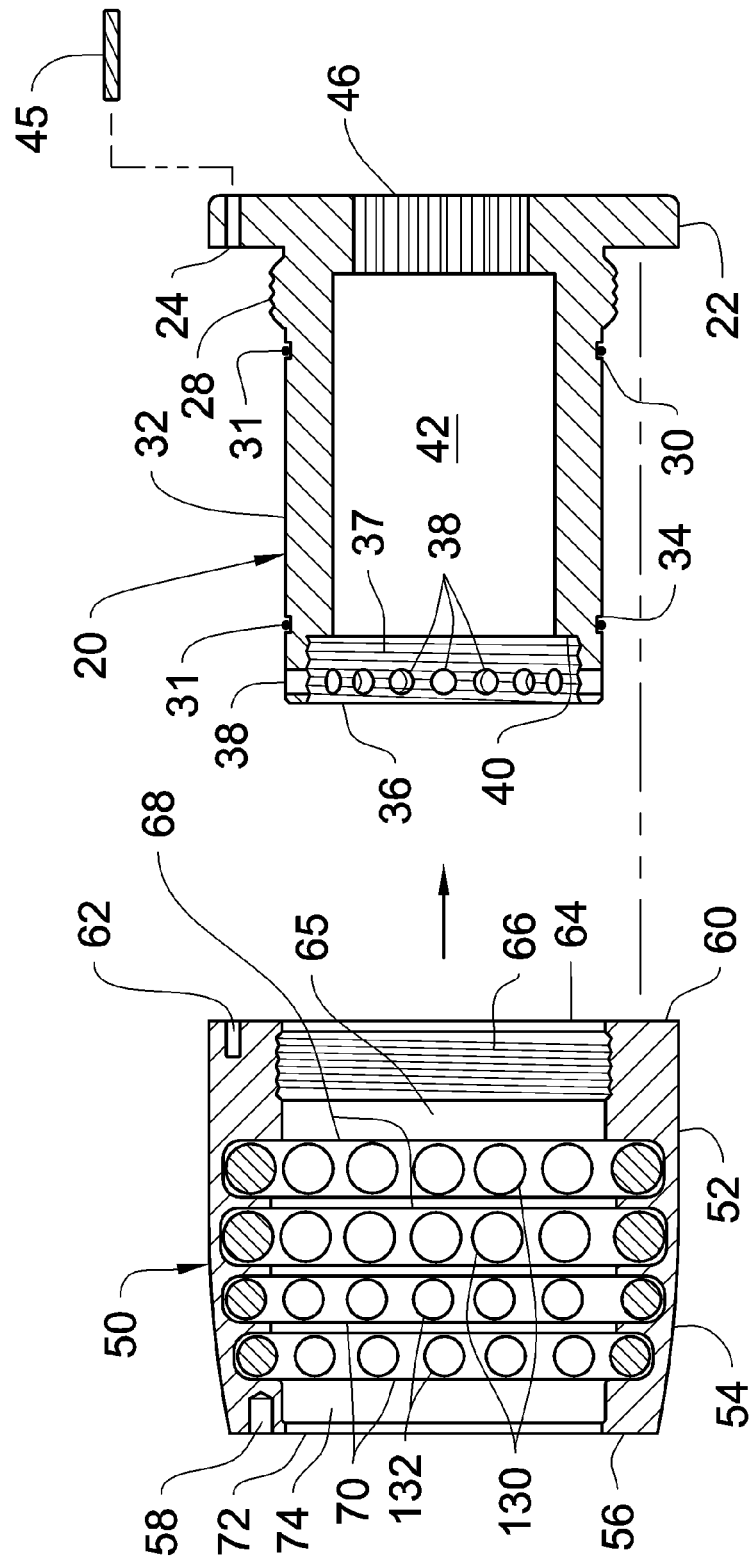
FIG. 19 is an exploded cross-sectional view of the outer body assembled with the inner body of the rotating object dynamic balancing system and method of the present invention.
Figure 20:
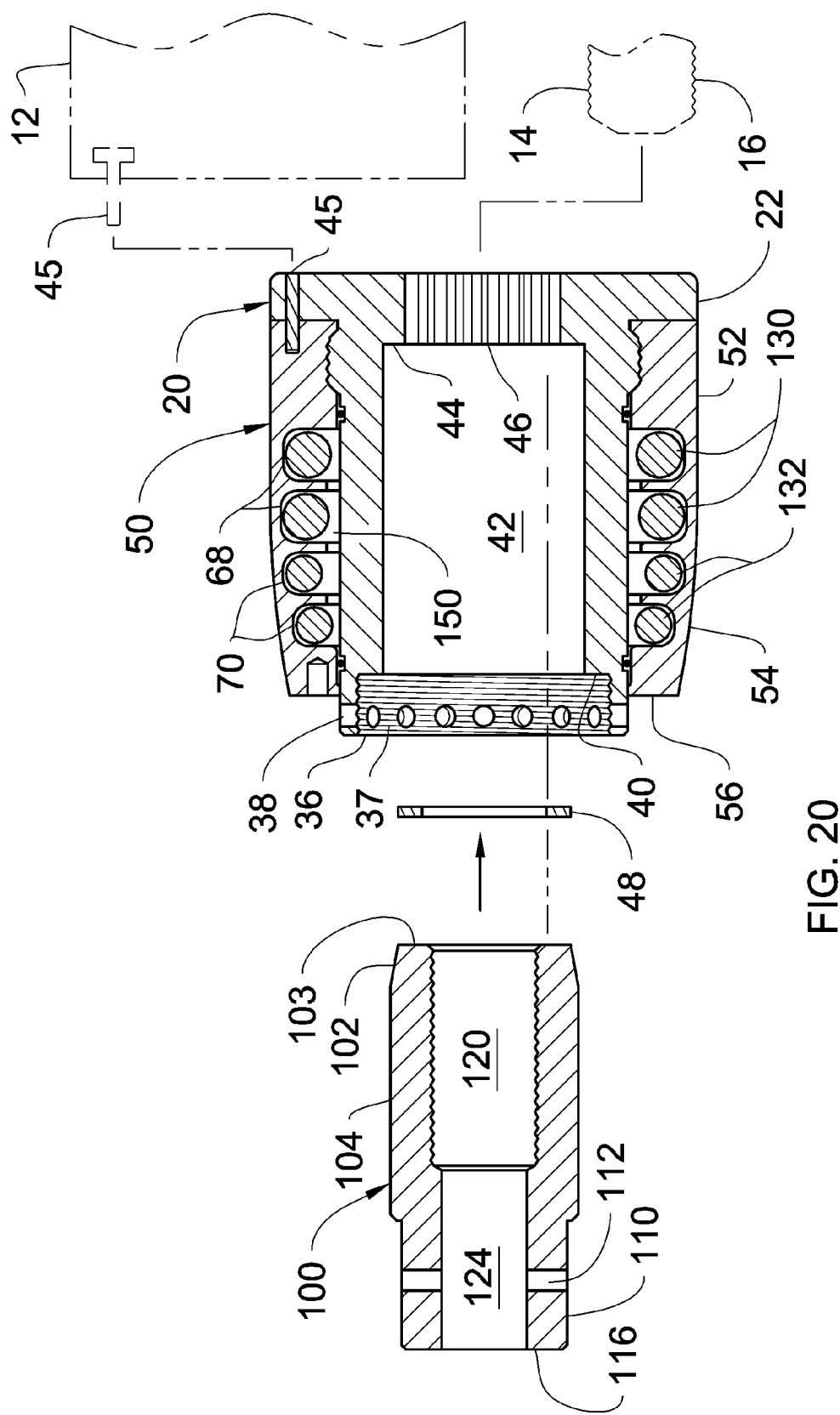
FIG. 20 is an exploded cross-sectional view of the fastening body assembled into and with the inner body of the rotating object dynamic balancing system and method of the present invention.
Figure 21:
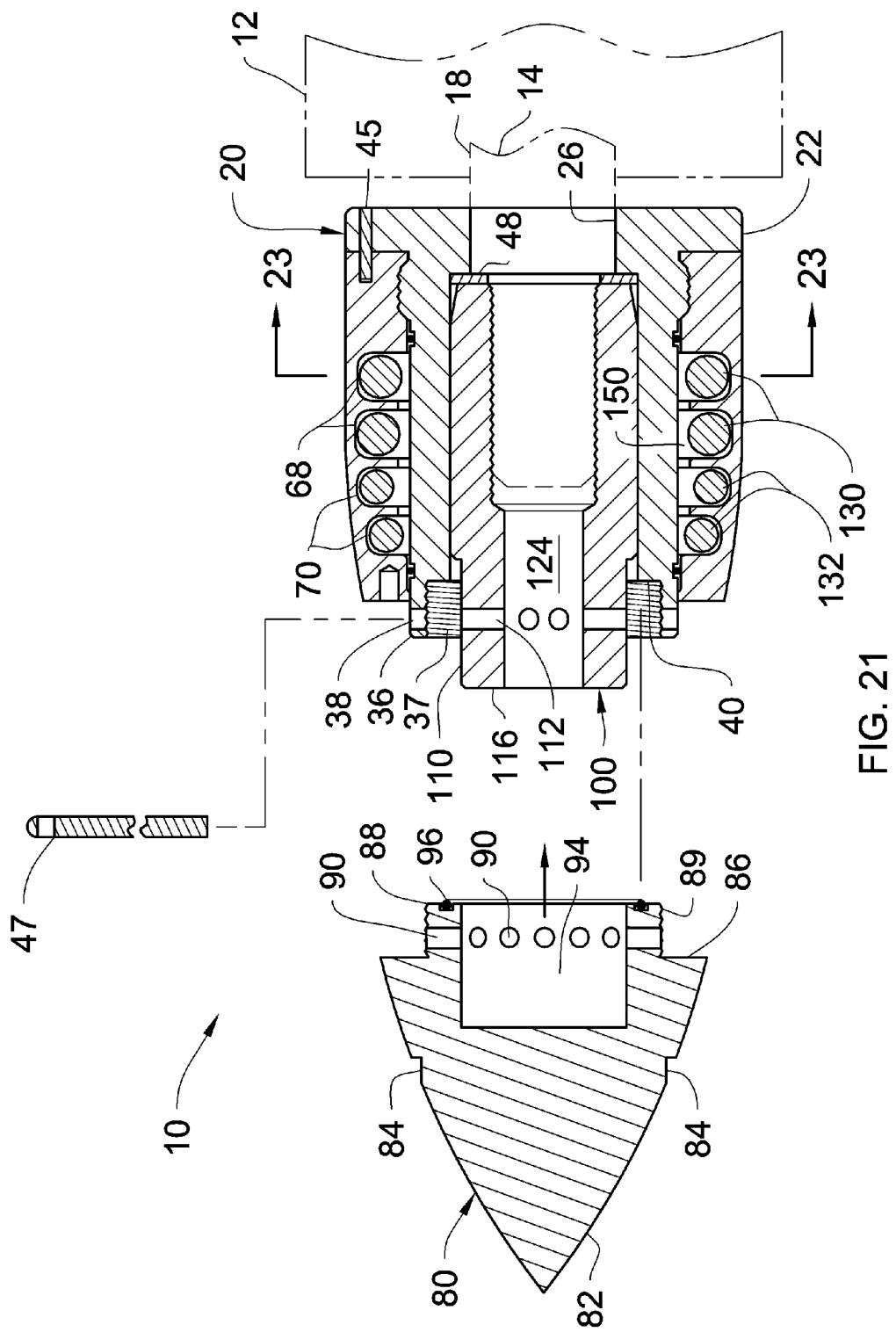
FIG. 21 is an exploded cross-sectional view of the tail cone assembled with the inner body of the rotating object dynamic balancing system and method of the present invention.

FIGS. 19-21 illustrate the method of assembling the rotating object dynamic balancing system 10. A plurality of weighted masses 130, 132 is positioned into their respective races 68, 70 of the outer body assembly 50. The weighted masses 130, 132 are radially oriented in their respective races to form a bearing-like configuration. The weighted masses 130, 132 are generally spherical or cylindrical in shape and are made of any strong and wear resistant material, such as but not limited to, steel, iron, carbide, and metal alloys. Multiple variations of races and channel configurations can be used.

Before the inner body assembly 20 can be fitted to the outer body assembly 50, the o-ring or sealing gasket 31 is placed in the first and second grooves 30, 34 of the inner body assembly 20, or in the alternative the first o-ring 31 is positioned between the external threaded section 28 and the flanged mounting section 22 of the inner body assembly 20.

The inner body assembly 20 is then inserted through the mounting section aperture 64 of the cylindrical mounting section 52 of the outer body assembly 50 until the internal threaded section 66 of the outer body assembly 50 comes in contact with the external threaded section 28 of the inner body assembly 20. The outer body assembly 50 is now substantially concentric with the inner body assembly 20 and they share the same longitudinal and central axis. The outer body assembly 50 is rotated, manually or via the bores 58, so the internal and external threaded sections 66, 28 engage, and until the mounting end face 60 of the outer body assembly 50 abuts a free end side of the flanged mounting section 22 of the inner body assembly 20. The outer body assembly 50 is continued to be rotated until the bores 24 of the flanged mounting section 22 are aligned with the bores 62 of the cylindrical mounting section 52 of the outer body assembly 50. The fastener or pin 45 is inserted into each aligned bores 24, 62, thereby securing the inner body assembly 20 to the outer body assembly 50, as best illustrated in FIG. 19. The fastener or pins 45 prevent the outer body assembly 50 from disengaging with the inner body assembly, and they transfer any rotation moment from the inner body assembly 20 to the outer body assembly 50. Alternatively, the fastener or pins 45 can be adapted to secure the assembly inner and outer body assemblies 20, 50 to the rotating objection 12.

Figure 23:
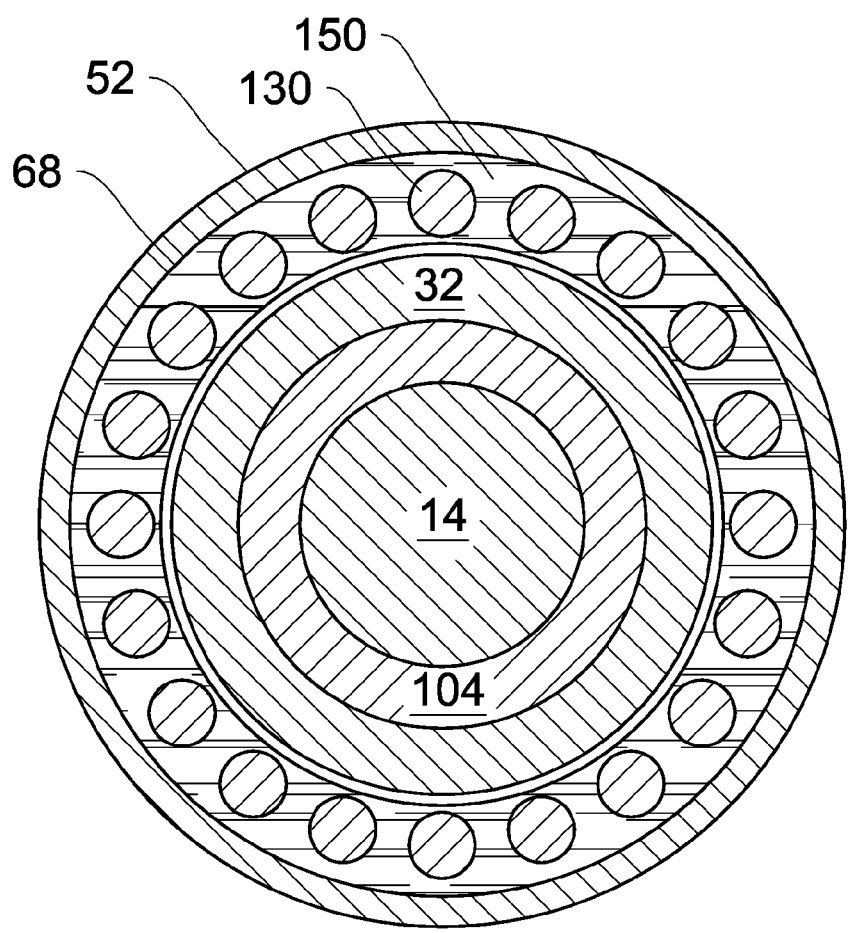
FIG. 23 is a cross-sectional view of the rotating object dynamic balancing system and method of the present invention taken along line 23-23 in FIG. 21.

With the inner body assembly 20 fixed to and received within the outer body assembly 50, the o-ring 31 of the first groove 30 is in sealable relationship with the first sealing surface 65 and the o-ring 31 of the second groove 34 is in sealable relationship with the second sealing surface 74 of the outer body assembly 50. The weighted masses 130, 132 and their respective races 68, 70 are now positioned around the cylindrical mid section 32 of the inner body assembly 20, as best illustrated in FIGS. 20 and 23. A channel 150 is formed between the races 68, 70 and the cylindrical mid section 32 of the inner body assembly 20. The weighted masses 130, 132 are now positioned to travel within the channel 150 of their respective races 68, 70, and around the cylindrical mid section 32 of the inner body assembly 20. The channel 150 can be filled with various gases or fluids, a combination of gases or fluids of varying pressures, various Newtonian fluids, various non-Newtonian fluids, fluids having various physical properties, or the channel 150 can be a vacuum. The sealing arrangement of the o-rings 31 of the first and second grooves 30, 34 and their respective sealing surfaces 65, 74 prevent any leakage or intrusion of gases or fluids into the channels 150.

The longitudinal length of the inner body assembly 20 is greater than the longitudinal length of the outer body assembly 50, so that the bores 38 of the free end section 36 of the inner body assembly 20 extend out past the free end face 56 of the tapered free end section 54 of the outer body assembly 50.

The assembled inner and outer body assemblies 20, 50 is fitted to the shaft 14 so that the aperture 26 of the flanged mounting section 22 of the inner body assembly 20 receives and engages with the splined section 18 of the shaft 14. Alternatively, the flanged mounting section 22 of the inner body assembly 20 can be directed and removably attached to the rotating object 12. The threaded section 16 of the shaft 14 is received through the aperture 26 of the flanged mounting section 22 until the threaded section 16 of the shaft 14 is in the interior area 42 of the inner body assembly 20.

The fastening body assembly 100, tapered mounting section 102 first, is inserted through the free end section 36 and the interior area 42 of the inner body assembly 20 until the internal threaded area 120 of the fastening body assembly 100 comes in contact with the threaded section 16 of the shaft 14. The fastening body assembly 100 is now substantially concentric with the inner body assembly 20 and the outer body assembly 50, and share the same longitudinal and central axis therewith. The tapering configuration of the tapered mounting section 102 assists the insertion of the fastening body assembly 100 into the interior area 42 of the inner body assembly 20.

The fastening body assembly 100 is rotated so the internal threaded area 120 engages with the threaded section 16 of the shaft 14 until the mounting end face 103 abuts the washer 48 which abuts against the edge 44 of the interior area 42 of the inner body assembly 20. The washer 48 prevents direct connection of the fastening body assembly 100 to the inner body assembly 20. The fastening body assembly 100 is rotated or driven either by, but not limited to, manually, with a tool, or by a machine via the free end section 108 or the polygonal planar surfaces 110 of the free end section 108. The fastening body assembly 100 is tightened so that it clamps the inner body assembly 20 to the splined section 18 of the shaft 14, or to the rotating object 12, thereby removably fixing the assembled inner body assembly 20 and the outer body assembly 50 concentrically to the shaft 14 adjacent or to the rotating object 12, as best illustrated in FIG. 21

The location of the bores 112 of the free end section 108 of the fastening body assembly 100 are arranged so that the bores 112 of the fastening body assembly 100 align with the bores 38 of the inner body assembly 20 when the fastening body assembly 100 abuts the edge 44 of the inner body assembly 20. The longitudinal length of the fastening body assembly 100 is greater than the longitudinal length of the inner body assembly 20 so that the free end face 116 extends out past the free end section 36 of the inner body assembly 20 so as to be engaged with by a wrench, tool or machine.

The mounting section 88 of the tail cone assembly 80 is inserted into the opening defined in the free end section 36 of the inner body assembly 20 so that the free end face 116 and the free end section 108 of the fastening body assembly 100 is received in the interior area 94 of the tail cone assembly 80 until the external mounting threaded section 89 of the tail cone assembly 80 comes in contact with the internal threaded section 37 of the free end section 36 of the inner body assembly 20. The tail cone assembly 80 is now substantially concentric with the inner body assembly 20, the outer body assembly 50 and the fastening body assembly 100, and shares the same longitudinal and central axis therewith.

Figure 22:
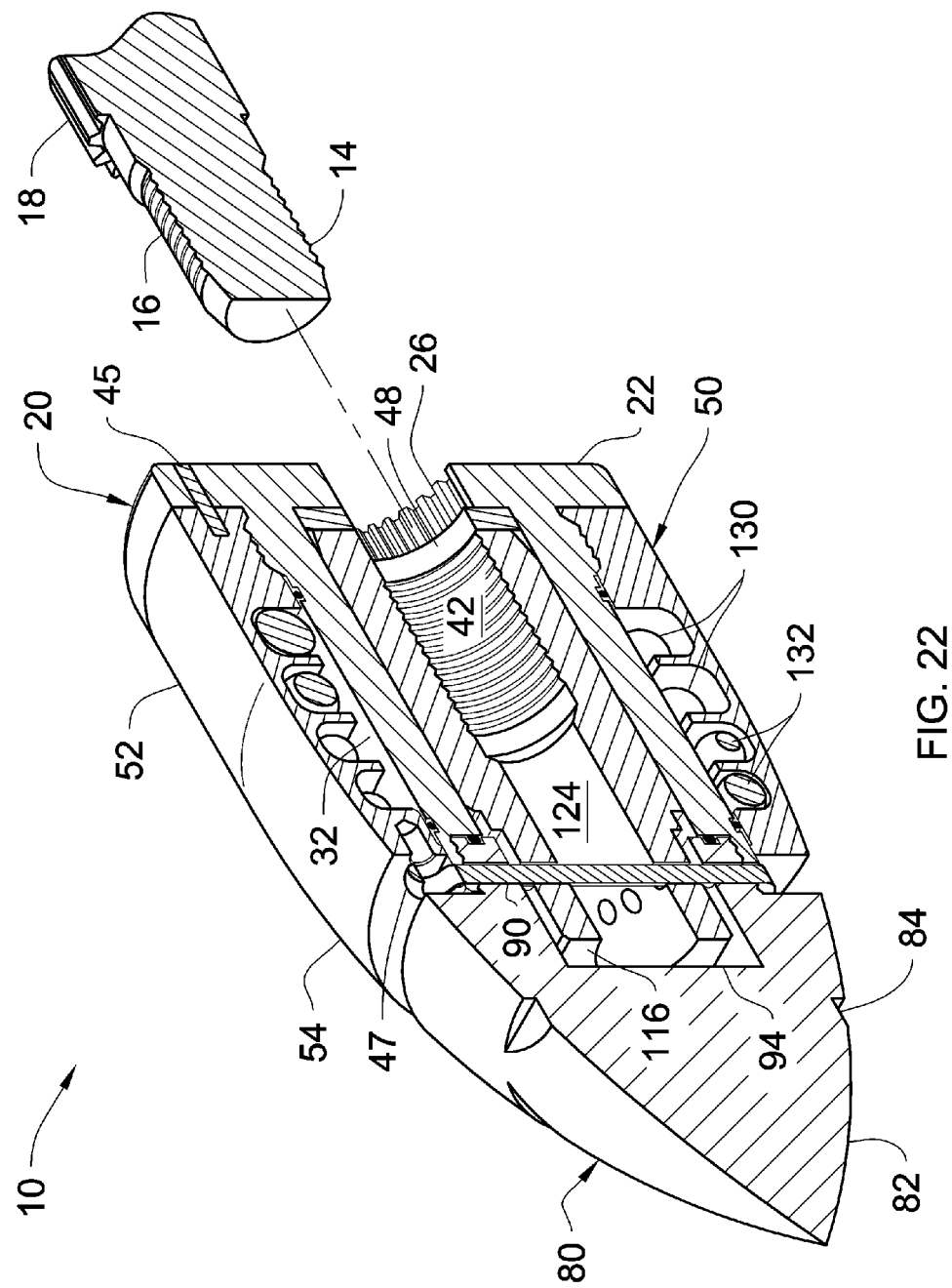
FIG. 22 is a perspective cross-sectional view of the assembled rotating object dynamic balancing system and method of the present invention.

The tail cone assembly 80 is rotated or driven either by, but not limited to, manually, with a tool, or by a machine via the free end body 82 or the notches 84 so that the internal threads 37 of the free end section 36 of the inner body assembly 20 engage with external threads 89 of the tail cone assembly 80. The tail cone assembly 80 is rotated until the o-ring or sealing gasket 96 fitted in the groove 96 of the mounting section 88 sealably contacts or abuts the edge 40 of the cylindrical mid section 32 of the inner body assembly 20. The tail cone assembly 80 is continued to be rotated or tightened so that the bores 90 of the mounting section 88 are aligned with the bores 38 of the free end section 36 of the inner body assembly 20 and the bores 112 of the free end section 108 of the fastening body assembly 100, as best illustrated in FIG. 22 with the shaft 14 exploded to provide a clear illustration thereof.

With the bores 38, 90, 112 of the inner body assembly 20, tail cone assembly 80 and fastening body assembly 100 aligned, the cotter pin or fastener 47 is inserted through a set of aligned cotter pin bores 38, 90, 112 so that the end of the cotter pin or fastener 47 extends into and through the bores. With the cotter pin or fastener 47 in place, the rotating object dynamic balancing system 10 is assembled and securely fixed together and to the shaft 14 or to the rotating object 12.

Figure 24:
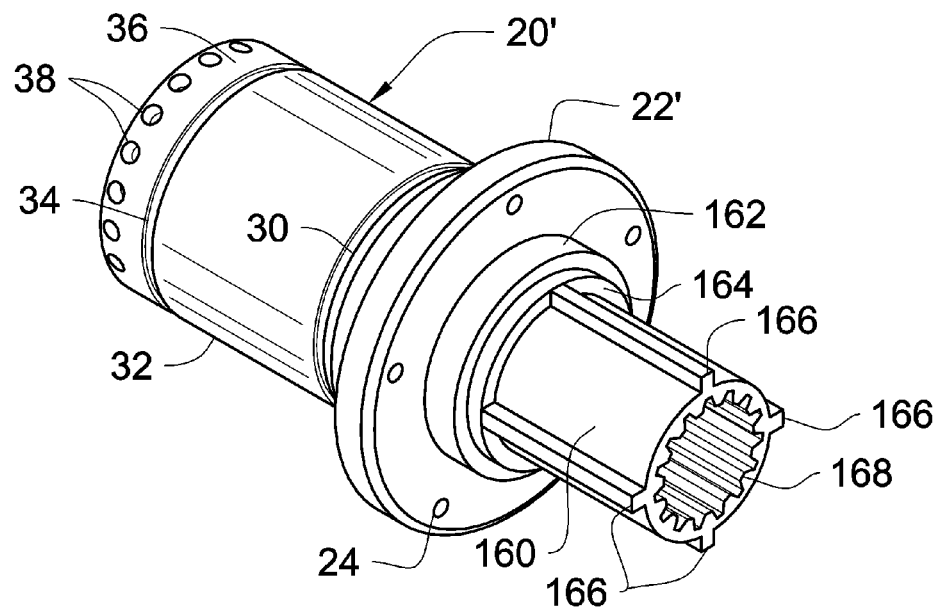
FIG. 24 is a perspective view of an alternate embodiment inner body assembly of the rotating object dynamic balancing system and method of the present invention.

FIG. 24 illustrates an alternate embodiment inner body assembly 20'. The alternate inner body assembly 20' includes an alternate embodiment flanged mounting section 22', an external threaded section 28, a groove 34, cylindrical mid section 32, free end section 36, a plurality of bores 38, interior area 42, and a mounting section extension 160. The mounting section extension 160 extends out from a flanged mounting section edge 162 of the flanged mounting section 22', and includes a plurality of keys or protrusions 166 and a splined interior area 168. The protrusions 166 run along the entire longitudinal length of the mounting section extension 160 to the flanged mounting section edge 162. An extension edge 164 connects the mounting section extension 160 and protrusions 166 to the flanged mounting section edge 162. The diameter of the mounting section extension 160 is less than extension edge 164 thereby producing the mounting extension edge 164. The diameter of the extension edge 164 is less than the flanged mounting section edge 162 thereby producing the flanged mounting section edge 162. The splined interior area 168 runs the entire longitudinal length of the mounting section extension 160 and is in communication with the aperture 26 and the interior area 42.

Figure 25:
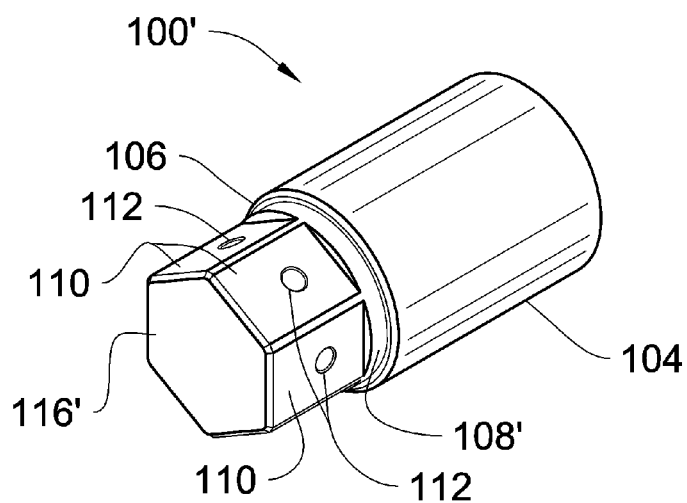
FIG. 25 is a perspective view of an alternate embodiment fastening body assembly of the rotating object dynamic balancing system and method of the present invention.

FIG. 25 illustrates an alternate embodiment fastening body assembly 100'. The alternate embodiment fastening body assembly 100' features an alternate embodiment free end section 108', an alternate embodiment free end face 116', an alternate embodiment interior area 124', a cylindrical mid section 104, a chamfered edge 106, a plurality of planar surfaces 110, a plurality of bores 112, and an internal threaded area 120. The alternate embodiment interior area 124' is defined into the free end section 108' but not through the free end face 116'. Hydraulic lock is avoided by relieving pressure via the plurality of bores 112.

FIG. 26 is cross-sectional view of an assembled rotating object dynamic balancing system and method 10' including the alternate embodiment inner body assembly 20' and the alternate embodiment fastening body assembly 100'. The splined interior area 168 of the mounting section extension 160 is configured to receive the splined section 18 of the shaft 14. The internal threaded area 120 of the fastening body assembly 100' is configured to threadably engage with the threaded section 16 of the shaft 14.

FIG. 26 additionally illustrates the alternative first o-ring configuration, wherein an o-ring 31 is positioned between the external threaded section 28 and the flanged mounting section 22 of the inner body assembly 20. A chamfered edge of the mounting end face 60 of the outer body assembly 50 engages with the o-ring 31 and sealingly clamps it against the flanged mounting section 22 and the surface defined between the external threaded section 28 and the flanged mounting section 22 of the inner body assembly 20.

Figure 27:
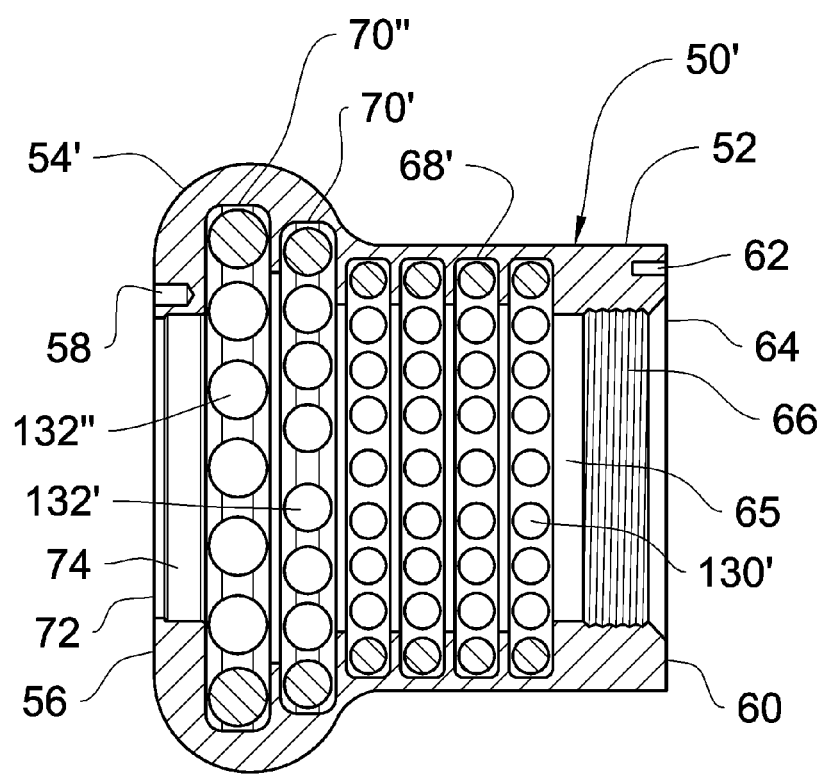
FIG. 27 is a cross-sectional view of an alternate embodiment outer body assembly of the rotating object dynamic balancing system and method of the present invention.

FIG. 27 is a cross-sectional view of an alternate embodiment outer body assembly 50' which can be used for heavier and larger propellers or rotating objects 12. The alternate embodiment outer body assembly 50' includes a cylindrical mounting section 52 and a bulbous free end section 54' adjacent thereto. Both the cylindrical mounting section 52 and the bulbous free end section 54' define a hollow interior sized to receive the external threaded section 28, the cylindrical mid section 32, and the free end section 36 of the inner body assembly 20, 20' therethrough. The diameter of the cylindrical mounting section 52 is substantially equal to the diameter of the flanged mounting section 22, 22' of the inner body assembly 20, 20', and the bulbous free end section 54' has a diameter greater than the diameter of the cylindrical mounting section 52 featuring a generally arcuate configuration. The outer body assembly 50' can be manufactured, machined or made from stainless steel, aluminum, brass, metal alloys, or any non-corroding or non-oxidizing materials.

The cylindrical mounting section 52 includes an mounting end face 60, an mounting aperture 64 defined in the mounting end face 60, an internal threaded section 66, a first sealing surface 65, and plurality of races 68'. A plurality of roll pin bores 62 are defined in and located radially around a central axis of the cylindrical mounting section 52. The mounting aperture 64 is concentric with the longitudinal axis of the outer body assembly 50' and is chamfered.

The internal threaded section 66 features a plurality of either right or left handed threads internally directed towards the longitudinal and central axis of the outer body assembly 50'. The internal threaded section 66 is adapted to threadably engage with the exterior threaded section 28 of the inner body assembly 20, 20' thereby removably securing the outer body assembly 50' to the inner body assembly 20, 20'.

The bulbous free end section 54' includes a free end face 56, an aperture 72 defined in the free end face 54, a second sealing surface 74, a first race 70', and a second free end race 70". The free end aperture 72 is concentric with the longitudinal axis of the outer body assembly 50' and is adapted to receive the free end section 36 of the inner body assembly 20, 20' therethrough.

The mounting races 68' are radially defined races that extends into the cylindrical mounting section 52 and adapted to receive a plurality of weighted masses 130'. The races 68' are sized to allow the weighted masses 130' to travel radially therealong, and alternatively can be a plurality of concentric races.

The free end races 70', 70" are radially defined in the bulbous free end section 54' and are adapted to receive a plurality of weighted masses 132', 132" respectively. The first free end race 70' has a diameter larger than the mounting races 68' and is adjacent thereto, and the second free end race 70" has a diameter larger than the first free end race 70' and is adjacent thereto. The width of the first free end race 70' greater than the width of the mounting races 68', and the width of the second free end race 70" greater than the width of the first free end race 70'. The first free end race weighted masses 132' are larger than the mounting races weighted masses 130', and the second free end race weighted masses 132" are larger than the first free end race weighted masses 132'. The mounting and free end races 68, 70', 70" define a channel with the cylindrical mid section 32 of the inner body assembly 20, 20' when assembled.

Figure 28:
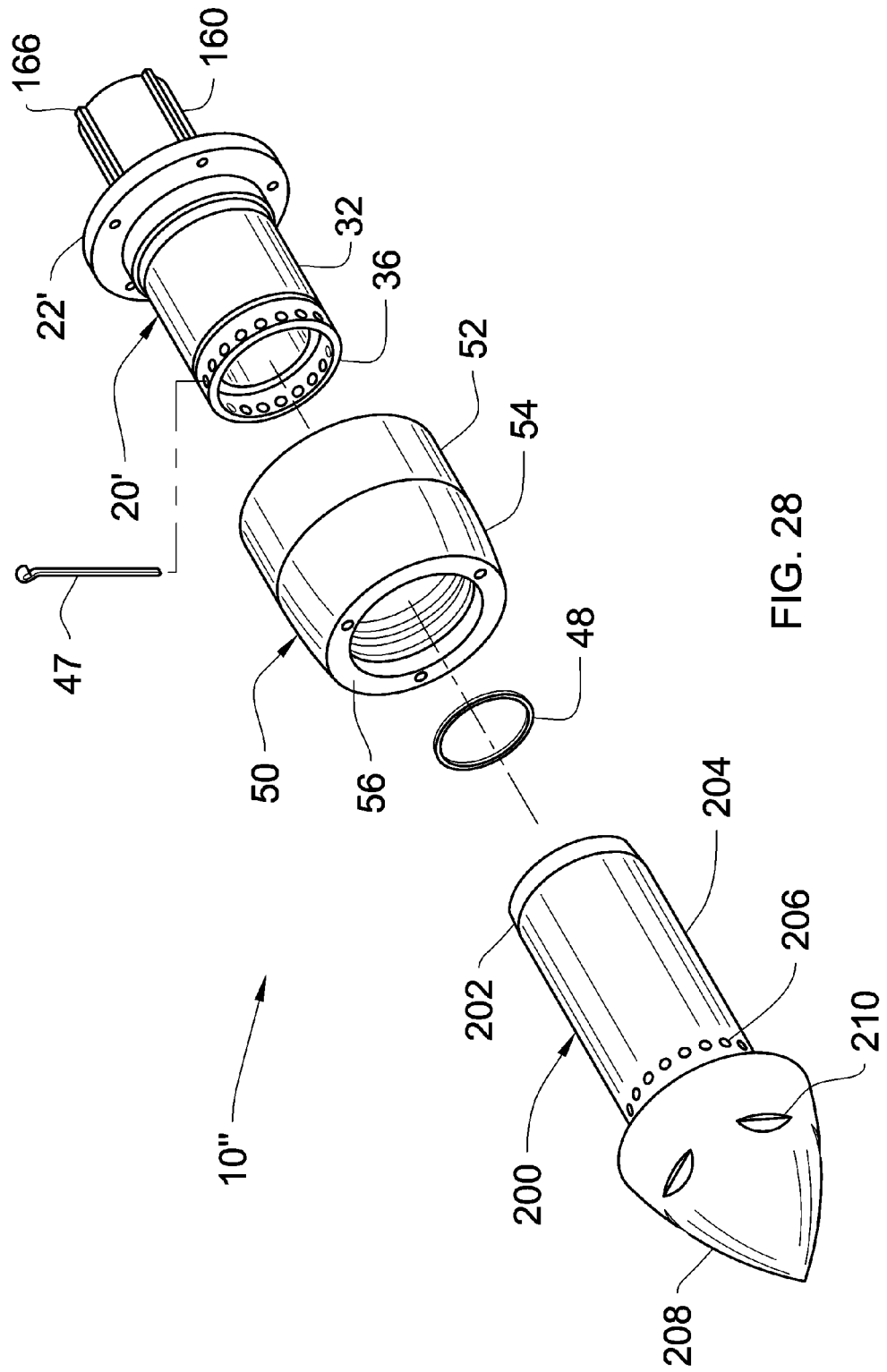
FIG. 28 is an exploded perspective view of an alternate embodiment of the rotating object dynamic balancing system and method of the present invention including an alternate embodiment fastening body assembly.

FIG. 28 is an exploded perspective view of an alternate embodiment rotating object dynamic balancing system 10" featuring the alternate embodiment inner body assembly 20', the outer body assembly 50, and an alternate embodiment fastening body assembly 200. It can be appreciated that the inner body assembly 20 can be used in place of the alternate embodiment inner body assembly 22', and the alternate embodiment outer body assembly 50' can be used in place of the outer body assembly 50 respectively.

The alternate embodiment fastening body assembly 200 broadly includes a tapered mounting section 202, a cylindrical mid section 204, a plurality of bores 206, and a tail cone 208. The fastening body assembly 202 is generally a combination of the above described fastening body and the tail cone assemblies, thereby simplifying manufacturing and assembling of the rotating object dynamic balancing system 10". The tapered mounting section 202 is configured to be inserted in the interior are 42 of the inner body assembly 20, 20'. The fastening body assembly 200 can be manufactured, machined or made from stainless steel, aluminum, brass, metal alloys, or any non-corroding or non-oxidizing materials.

Figure 29:
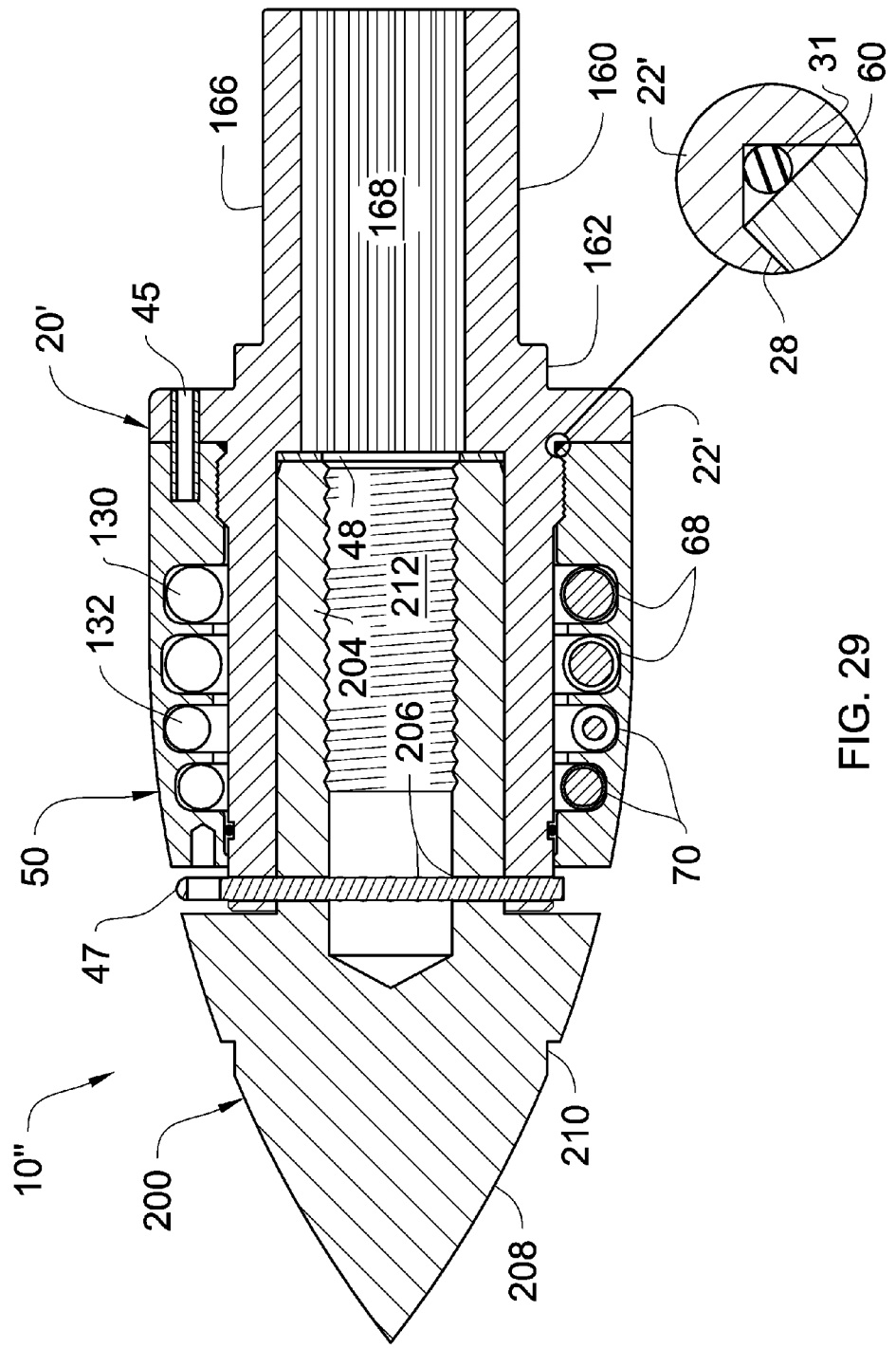
FIG. 29 is a cross-sectional view of an assembled alternate embodiment rotating object dynamic balancing system and method of FIG. 28.

The bores 206 are radially located around the circumference of the cylindrical mid section 204 opposite the tapered mounting section 202, and are in communication with a threaded internal area 212 of the cylindrical mid section 204, as best illustrated in FIG. 29. The bores 206 are adapted and configured to receive the fastener or pin 47 therethrough, and are oriented so that each bore 206 has a corresponding bore oppositely aligned therewith. The cylindrical mid section 204 is adjacent to the largest diameter of the tapered mounting section 202, and has a diameter less than the diameter of the interior area 42 of the inner body assembly 20, 20'. The threaded internal area 212 runs from the tapered mounting section 202 and into the cylindrical mid section 204, and which features either right or left handed threads. The threaded internal area 212 is adapted to engage with the threaded section 16 of the shaft 14 or with an external threaded section (not shown) of the rotating object 12. The threaded internal area 212 can extend into the interior of the tail cone 208.

The tail cone 208 is adjacent to the bores 206 and is opposite the tapered mounting section 202. The tail cone 208 has a substantially conical or tapering shape directed away from the cylindrical mid section 204, and includes a plurality of notches 210 radially and equally defined in the exterior of the free tail cone 208. The notches 210 each have a pair of planar and perpendicular faces which are adapted to be received by a wrench-like tool so as to provide a rotational force to the fastening body assembly 200.

The tapered mounting section 202 is adapted to abut with the washer 48 when assembled. The bores 206 are located through the cylindrical mid section 206 at a distance from the tapered mounting section 202 so as to align with the bores 38 of the inner body assembly 20, 20' when the tapered mounting section 202 abuts the washer 48 or the edge 44 of the inner body assembly 20, 20'. This allows the cotter pin or fastener 47 to be inserted through a single or pair of bores 38 of the inner body assembly 20, 20' and a single or pair of bores 206 of the fastening body assembly 200. The longitudinal length of the outer body assembly 50, 50' produces a gap between the free end section 54, 54' and the tail cone 208 allowing for a wrench or tool to be received therein to drive the fastening body assembly 200.

It can be appreciated that the cylindrical mid section 204 can include a plurality of planar surfaces in a radial orientation about the longitudinal and central axis of the fastening body assembly 202 adjacent to the bores 206 or the tail cone 208, thereby forming a polygon. The planar surfaces are adapted to be engaged by a wrench, pliers, or tool, so as to provide a rotational motion to the fastening body assembly 200 thereby assembling the fastening body assembly 200 to the shaft 14 or the rotating object 12.

In use, it can now be understood that the rotating object dynamic balancing system is removably and securely connected to a rotating shaft of a rotating object, such as but not limited to a propeller shaft of an outboard or stern drive engine. When the rotating object is rotatably driven it can be unbalanced which produces vibration and damage to the rotating object or anything attached thereto. The result can be catastrophic if the rotating object is rotating or operating at high speeds or revolutions per mifastening bodye (RPM). With the rotating object dynamic balancing system attached to the shaft, the rotating object dynamic balancing system will provide a dynamic balancing force to the shaft or to the rotating object when in rotational operation. This is accomplished by the fact that the rotational motion of the shaft is transferred to the inner body assembly through the splined aperture connection. The inner body assembly transfers the rotation motion to the outer body assembly through exterior threaded section and the pins of the outer body assembly.

While the outer body assembly rotates, due to the transfer of rotation motion from the shaft, the weighted masses travel to the outermost diameter of their respective races due to the centrifugal force produced by the rotation of the rotating object dynamic balancing system. When the present invention is rotated, the weighted masses tend to fill the radially outer portion of the races under the influence of centrifugal force. This centrifugal force is applied to the weighted masses in the direction perpendicular to the longitudinal and central axis of the rotating object dynamic balancing system and the shaft or the rotating object. Such resultant forces balance and thus stabilize the assembly. This even distribution is varied, however, by response of the weighted masses to transverse vibration so that the weighted masses automatically assumes a distribution acting to cancel or counteract the unbalance of the remainder of the rotating shaft or rotating object.

The shape of the outer circumferential wall of the races can be modified so that the sliding friction occurring between the weighted masses and a bottom surface of the races can be considerably reduced. Also, by allowing the weighted masses to rollingly contact the race, the weighted masses can quickly move to the positions to restrict internal vibrations due to unbalanced mass so that capability of the present invention is improved. Further, since an amount of fluid is introduced into the races to coat the surfaces of the weighted masses, the weighted masses are dampened around the compensated positions and abrasion of the weighted masses themselves can be prevented. It can be appreciated that the races can be injected with gases or can be a vacuum.

The balancing force of the rotating object dynamic balancing system can be tuned by altering the size, shape, weight and total number of the weighted masses. Additionally, the balancing force can be adjusted or tuned by the properties of the fluid or gas in the races. Various types of fluids can be used with various physical properties, such as but not limited to, density, viscosity and shear thickening. Various non-Newtonian fluids can be used having active and passive properties, such as but not limited to, dilatantic, rheopectic or thixotropic, hydro-rheological, pneumo-rheological, magneto-rheological, vibro-rheological, thermo-rheological, or electro-rheological.

In the above course, the force applied to the weighted masses functions of settling the present invention down, so that the rotating object dynamic balancing system and method can rotate stably. Also, when the rotational speed exceeds the resonant speed, the weighted masses can rapidly move to a position which opposes the condition of imbalance. Accordingly, the rotation is stabilized, and the vibration and noise can be reduced.

As apparent from the above description, the rotating object dynamic balancing system according to the present invention can decrease vibration by stabilizing the rotation of the weighted masses of when the rotational speed of the rotating object is the resonant speed, or less or more than the resonant speed.

Also, by providing a fluid or gas in the races, various parameters (such as, but not limited to, transient response time) can be optimized.

While a preferred embodiment of the rotating object dynamic balancing system and method has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, composite, alloy, or a variety of wood may be used instead of the materials described above. And although dynamically balancing a marine propeller have been described, it should be appreciated that the rotating object dynamic balancing system and method herein described is also suitable for balancing any rotating object having a rotating shaft.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dynamic balancing system for balancing a rotating object, said dynamic balancing system comprising:
an inner body having a first hollow interior area defined through said inner body, and an external threaded section;
an outer body having a second hollow interior area defined through said outer body, and an internal threaded section in communication with said second hollow interior area, and at least one race defined in said outer body in communication with said second hollow interior area, said outer body being attachable to said inner body, said second hollow interior area of said outer body being configured to receive said inner body therein, said internal threaded section is engageable with said external threaded section of said inner body;
a fastening body having a third hollow interior area defined in said fastening body, said fastening body being configured to be received in said first hollow interior area of said inner body, said third hollow interior area of said fastening body being configured to removably engage with one of the rotating object, and a shaft of the rotating object thereby securing said inner body and said outer body to the rotating object; and
at least one weighted mass configured to be received in and travel along said race of said outer body, said weighted mass being configured to travel to an outermost diameter of said race due to a centrifugal force produced by rotation of the rotating object, thereby balancing the rotating object.

2. The dynamic balancing system as set forth in claim 1, wherein said inner body further comprises a flanged mounting section, and a cylindrical section adjacent said flanged mounting section, said cylindrical section further comprises said external threaded section adjacent said flanged mounting section.

3. The dynamic balancing system as set forth in claim 2, wherein said outer body further comprises a mounting section defining a portion of said second hollow interior area, and an outer body free end section adjacent said mounting section, said portion of said second hollow interior area of said mounting section further comprises said internal threaded section configured to be threadably engageable with said external threaded section of said cylindrical section of said inner body.

4. The dynamic balancing system as set forth in claim 3, wherein said inner body further comprises an inner body free end section adjacent said cylindrical section, said inner body free end section defining a plurality of bores defined through said inner body free end section and in communication with said first hollow interior area of said inner body.

5. The dynamic balancing system as set forth in claim 2, wherein said flanged mounting section of said inner body defines an aperture in communication with said first hollow interior area of said inner body, wherein said aperture has a diameter less than said first hollow interior area of said inner body thereby forming an edge.

6. The dynamic balancing system as set forth in claim 5, wherein said fastening body further comprises a mounting section, and a cylindrical mid-section adjacent said mounting section.

7. The dynamic balancing system as set forth in claim 6, wherein said fastening body has a diameter larger than said aperture of said flanged mounting section of said inner body, and wherein said flanged mounting section of said inner body has a diameter larger than a diameter of said cylindrical section of said inner body.

8. The dynamic balancing system as set forth in claim 5, wherein said fastening body further comprises a plurality of bores defined through said fastening body which are in communication with third hollow said interior area of said fastening body, and wherein said bores of said inner body and said fastening body are configured to be aligned when said inner body and said fastening body are assembled and are configured to receive a fastener therethrough.

9. The dynamic balancing system as set forth in claim 1, wherein said inner body further comprises at least one sealing ring attachable to an exterior of said inner body, and wherein said outer body has at least one sealing surface configured to be in contact with said sealing ring when said inner body and said outer body are assembled.

10. The dynamic balancing system as set forth in claim 9, wherein said sealing ring and said sealing surface of said outer body are configured to retain a fluid located within said race of said outer body.

11. The dynamic balancing system as set forth in claim 1, wherein said fastening body further comprises a tail cone adjacent engageable with said inner body, said tail cone having a substantially conical configuration.

12. The dynamic balancing system as set forth in claim 11, wherein said tail cone defines at least one notch in an exterior of said tail cone.

13. A dynamic balancing system comprising:
an inner body having a mounting section, a substantially cylindrical section adjacent said mounting section, an inner body free end section, and a first hollow interior area defined in said cylindrical section, said mounting section defining an aperture in communication with said first hollow interior area, said aperture having a diameter less than said first hollow interior area thereby forming an edge, said aperture being configured to receive a shaft of a rotating object therethrough;
an outer body having a mounting section, an outer body free end section, a second hollow interior area defined through said outer body, and a plurality of races defined in said second hollow interior area, said outer body being attachable to said inner body, said second hollow interior area of said outer body being configured to receive said cylindrical section and said inner body free end section of said inner body therein, said races being orientated so as to be adjacent with said cylindrical section of said inner body when said mounting section of said outer body abuts said mounting section of said inner body thereby forming a channel;
a fastening body having a mounting section, a substantially cylindrical section adjacent said mounting section, and a third hollow interior area defined in said fastening body, said fastening body being configured to be received within said first hollow interior area of said inner body so an end of said fastening body abuts said edge of said inner body, said third hollow interior area of said fastening body being configured to removably engage with the shaft of the rotating object received through said aperture of said mounting section of said inner body thereby securing said inner body and said outer body to the rotating object;
a plurality of weighted masses configured to be received in and travel along said races of said outer body, said weighted masses each being configured to travel to an outermost diameter of said races respectively due to a centrifugal force produced by rotation of the rotating object, thereby balancing the rotating object; and
a tail cone adjacent said cylindrical section of said fastening body.

14. The dynamic balancing system as set forth in claim 13, wherein said cylindrical section of said inner body further comprises an external threaded section adjacent said mounting section, and wherein said second hollow interior area of said mounting section of said outer body further comprises an internal threaded section configured to be engageable with said external threaded section of said inner body.

15. The dynamic balancing system as set forth in claim 13, wherein said inner body free end section of said inner body defines an aperture in communication with said first hollow interior area, said aperture having a diameter greater than the diameter of said first hollow interior area thereby forming an edge.

16. The dynamic balancing system as set forth in claim 15, wherein said tail cone further comprises at least one notch defined in an exterior of said tail cone.

17. The dynamic balancing system as set forth in claim 13, wherein said inner body free end section of said inner body further comprises a plurality of inner body bores defined through said inner body free end section which are in communication with said first hollow interior area of said inner body, wherein said fastening body further comprises a plurality of fastening body bores defined through said fastening body, and wherein said inner body bores and said fastening body bores of said fastening body are configured to be aligned when said inner body, and said fastening body are assembled, said inner body bores and said fastening body bores being configured to receive a fastener therethrough.

18. The dynamic balancing system as set forth in claim 13, wherein said inner body further comprises at least one sealing ring attachable to an exterior of said inner body, and wherein said outer body has at least one sealing surface in said second hollow interior area and is configured to be in contact with said sealing ring when said inner body and said outer body are assembled.

19. The dynamic balancing system as set forth in claim 18, wherein said sealing ring and said sealing surface of said outer body are configured to retain a fluid located within said race of said outer body and said channel.

20. A method of balancing a rotating object through use of a dynamic balancing system, said method comprising the steps of:
providing a dynamic balancing system comprising: an inner body having a first hollow interior area defined through said inner body, and an external threaded section; an outer body having a second hollow interior area defined through said outer body, and an internal threaded section in communication with said second hollow interior area, and at least one race defined in said outer body in communication with said second hollow interior area, said outer body being attachable to said inner body, said second hollow interior area of said outer body being configured to receive said inner body therein; a fastening body having a third hollow interior area defined in said fastening body, said fastening body being configured to be received in said first hollow interior area of said inner body; and at least one weighted mass configured to be received in and travel along said race of said outer body;
placing said weighted mass in said race of said outer body so as to allow said weighted mass to freely travel within said race;
fixing said outer body to said inner body with said inner body received within said second hollow interior area of said outer body so that said external threaded section of said inner body is engageable with said internal threaded section of said outer body;

inserting said fastening body within said first hollow interior area of said inner body;

inserting a shaft of the rotating object into said third hollow interior area of said fastening body;

fixing said fastening body to the rotating object; and initiating rotation of the rotating object about a rotational axis which is a longitudinal and central axis of said dynamic balancing system attached thereto, upon rotation said weighted mass travels to an outermost diameter of said race due to a centrifugal force produced by rotation of the rotating object, thereby balancing the rotating object.

* * * * *